(12) United States Patent
Sboychakova et al.

(10) Patent No.: US 11,960,500 B1
(45) Date of Patent: Apr. 16, 2024

(54) NATURAL LANGUAGE DATA ANALYSIS, VISUALIZATION AND EDITING SYSTEM

(71) Applicant: Flowfinity Wireless, Inc., Vancouver (CA)

(72) Inventors: Olga Sboychakova, Merritt (CA); Dmitry Mikhailov, Surrey (CA)

(73) Assignee: Flowfinity Wireless, Inc., Vancouver (CA)

( * ) Notice: Subject to any disclaimer, the term of this patent is extended or adjusted under 35 U.S.C. 154(b) by 0 days.

(21) Appl. No.: 18/504,777

(22) Filed: Nov. 8, 2023

Related U.S. Application Data

(60) Provisional application No. 63/506,579, filed on Jun. 6, 2023.

(51) Int. Cl.
| | | |
|---|---|---|
| *G06F 16/20* | (2019.01) | |
| *G06F 16/26* | (2019.01) | |
| *G06F 40/20* | (2020.01) | |
| *G06Q 10/067* | (2023.01) | |

(52) U.S. Cl.
CPC .............. *G06F 16/26* (2019.01); *G06F 40/20* (2020.01); *G06Q 10/067* (2013.01)

(58) Field of Classification Search
CPC ........ G06F 16/26; G06F 40/20; G06Q 10/067
See application file for complete search history.

(56) References Cited

U.S. PATENT DOCUMENTS

| | | | |
|---|---|---|---|
| 11,232,383 B1 * | 1/2022 | Burns, Sr. .......... | G06Q 10/0637 |
| 2015/0012829 A1 * | 1/2015 | Brown .................... | G06F 3/167 |
| | | | 715/728 |
| 2018/0181626 A1 * | 6/2018 | Lyons ................ | G06Q 30/0201 |
| 2018/0308024 A1 * | 10/2018 | Kilner .............. | H04N 21/47217 |
| 2020/0007474 A1 * | 1/2020 | Zhang ...................... | G09B 7/02 |
| 2021/0271683 A1 * | 9/2021 | Imielinski ......... | G06F 16/24578 |
| 2021/0390099 A1 * | 12/2021 | Rahmfeld ......... | G06F 16/24522 |
| 2022/0092508 A1 * | 3/2022 | Suthan .................... | G06F 16/26 |
| 2023/0023181 A1 * | 1/2023 | Shang .................... | G06F 16/26 |
| 2023/0142664 A1 * | 5/2023 | Ackerman ............. | H10N 50/85 |
| | | | 706/50 |

* cited by examiner

*Primary Examiner* — Eliyah S. Harper
(74) *Attorney, Agent, or Firm* — Mehrman Law Office; Michael J. Mehrman

(57) ABSTRACT

The present invention may be embodied in a natural language processing system that conducts user interaction to identify and refine requests for data analyses, and automatically conducts data mining and prepares data visualizations in response to natural language queries. Similarly natural language processing system can be utilized for updating business system data in response to natural language requests. The system greatly improves the ease of use, intuitiveness, variety, and responsiveness of the data analytics system by converting natural language requests into requests for data analyses. This allows a much wider range of users to conduct commercially relevant data analytics without relying on specialists in the field data analytics specialists and at much lower cost than the conventional approach.

17 Claims, 18 Drawing Sheets

1000
AD-HOC
USER INTERFACE

QUERY WIDGET: CUSTOMERS

Request | Which customer owes us the most money? | Run

Result:

The customer that owes the most money is ABC Co, LLC, with a total amount owed of $167,223.35

Description of the result:

This query returns the name of the person or company that is owed the most money (TotalOwed) for items that are currently receivable or doubtful. The result is sorted in descending order so that the name of the entity owed the most money appears at the top, and it returns only one result Accept, it is correct | Reject, it is incorrect

*FIG. 10*

1100
AD-HOC QUERY HISTORY
USER INTERFACE

QUERY WIDGET: CUSTOMERS

Request | Which customer owes us the most money? | Run

Result:

.....

Description of the result:

....

View history

HISTORY OF REQUESTS

1. Show customers with invoices in 2022

2. Order results of #1 by date in reverse order

3. Show only 3 top results from #2

*FIG. 11*

1300
AD-HOC QUERY
VARIATION

| QUERY WIDGET: CUSTOMERS | |
|---|---|
| Request | Which customer owes us the most money? | Run |

Result:

| CUSTOMER NAME | TOTAL AMOUNT OWED |
|---|---|
| ABC CO, LLC | $167,223.35 |

Description of the result:

This query returns the name of the person or company that is owed the most money (TotalOwed) for items that are currently receivable or doubtful. The result is sorted in descending order so that the name of the entity owed the most money appears at the top, and it returns only one result Accept, it is correct | Reject, it is incorrect

*FIG. 13*

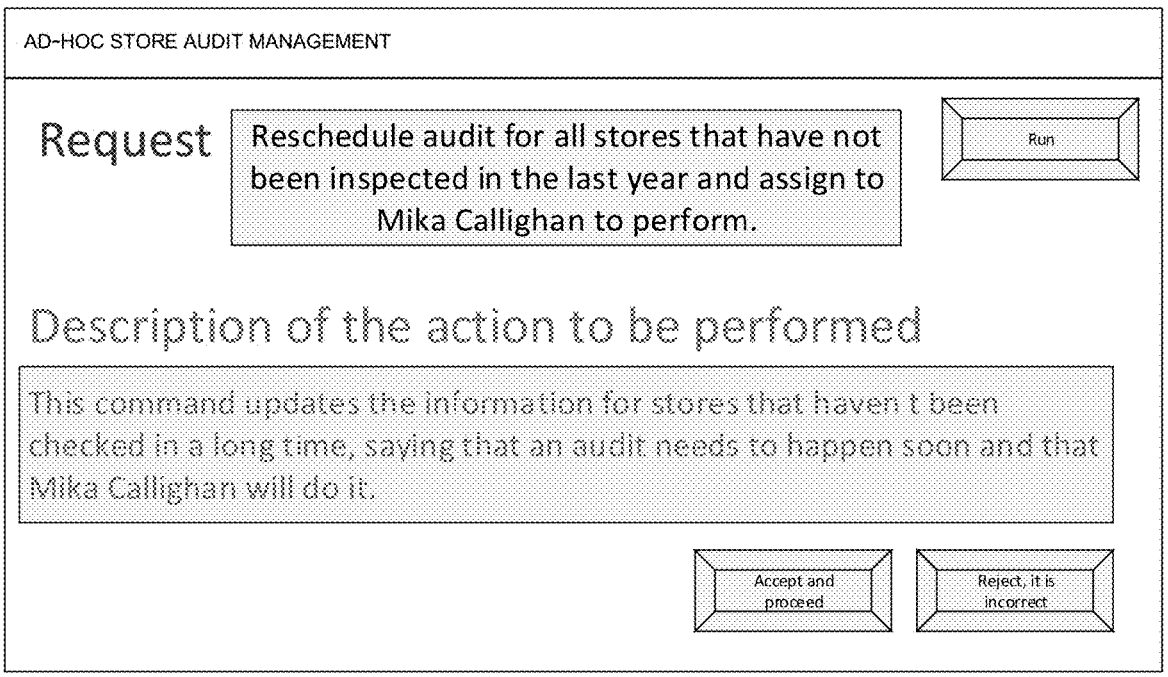
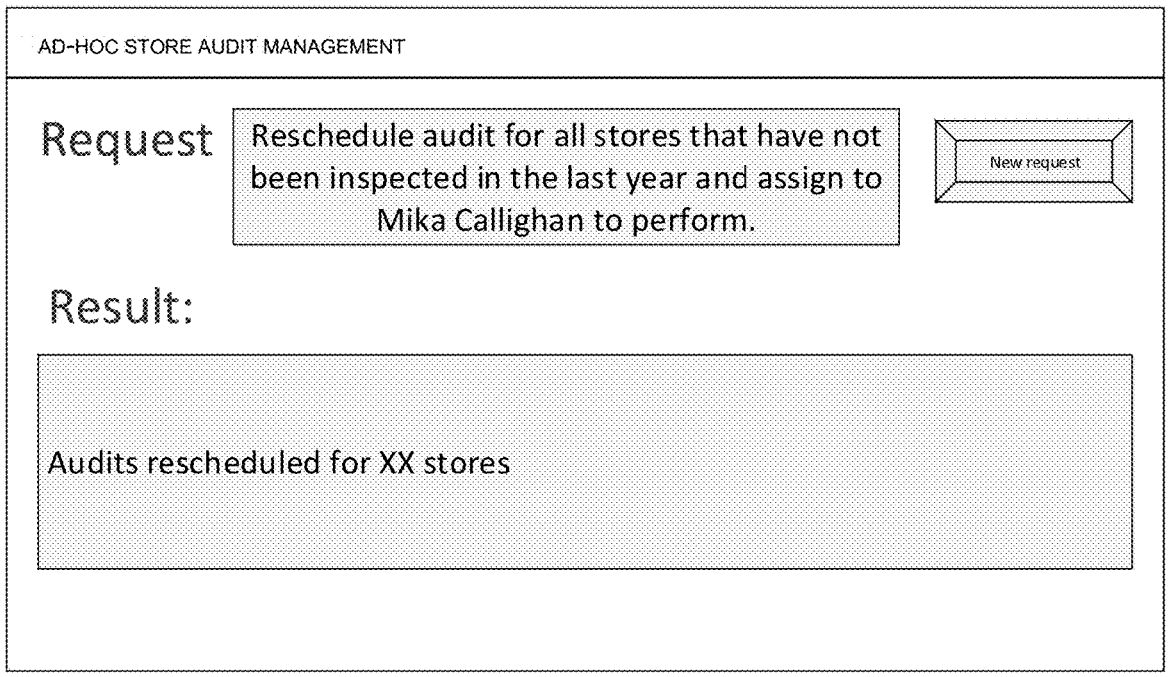
FIG. 15

NATURAL LANGUAGE DATA ANALYSIS, VISUALIZATION AND EDITING SYSTEM

REFERENCE TO RELATED APPLICATION

The application claims filing priority to U.S. Provisional Patent Application Ser., No. 63/506,579 filed Jun. 6, 2023, which is incorporated by reference.

TECHNICAL FIELD

The present invention relates to natural language processing systems and, more particularly, to a natural language data analysis, visualization and editing system that responds to natural language queries by conducting data analyses, presenting visualizations of data results in a variety of formats, and editing the underlying data.

BACKGROUND

The explosion in computer usage and cloud computing systems has led to a tremendous increase in the online availability of a wide range of data. In many cases, there is so much data available for a particular data analysis that locating, sorting through, and intuitively formatting the available data presents the data analyst with a significant challenge. Conducting research to identify relevant information, sometimes referred to as "data mining," becomes increasingly difficult as the amount of potential source data, the number of potential data sources, and different types of formats of the data sources increases. In addition, the available data is often available on different ranges (e.g., coordinates), in different scales, and in different presentation formats. Converting and presenting the available data in an intuitive format, sometimes referred to as "data visualization," also becomes increasingly difficult as variety of formats of potential source data increases. As a result, even conceptually simple data analytics become increasingly complex as the volume and variety of formats increases.

For example, in the typical business flow and analysis system, when the user needs to view, analyze or update submitted data in the system, a desired data mining or data visualization has to be preprogrammed to allow the user to request data from certain entities. This often means fixing a specific list of parameters to request from the user, the columns to be displayed, and the filter clause that should be applied to return the desired data in the desired visualization format to the user. If the user requires slight changes in how the data is gathered, filtered or displayed, a detailed "change request" has to be prepared and submitted for approval and implementation. The change request preparation, approval, and execution process from the user through the software production cycle, including scheduling into the production, then actual development, testing and release until it reaches the user can take frustratingly long time.

In a complex enterprise-grade data mining and visualization system, the time line between the identified need through implementation may take from a month to a year. Only at that point can the user review the result and make changes—only to wait through another change order process. Consequently, many minor requests in the way data is presented and filtered do not even get approved. Instead the complete data set may be exported into Excel or CSV or similar transfer format by the user (subject to this feature availability in the business flow system). The user then runs simpler off-system calculations on the exported data using external software. Although this approach addresses the user's need to some extent, it is cumbersome to complete, inherently error prone, and may also be outside the immediate user's expertise. Executives in need of the data analysis may not have the skill sets, and may not want to spend their time, conducting data exports and preparing their own data charts to figure out what they need to know. Inefficient, ineffective, cumbersome, or delayed data analysis can lead to serious mistakes in executive decision making. Unavailable, delayed, or poor quality data analysis can lead to information siloing, undetected errors in final calculations, errors in interpreting the data, executive decision making based on less than the best available and most current data. Poor data procedures or security also presents the risk of potential security breach if, for example, the data analysis is prepared or copied on a non-secured computer storage devices.

SUMMARY

The present invention may be embodied in a natural language processing system that conducts user interaction to identify and refine requests for data analyses, and automatically conducts data mining and prepares data visualizations in response to natural language queries. The system greatly improves the ease of use, intuitiveness, variety, and responsiveness of the data analytics system by converting natural language requests into requests for data analyses. This allows a much wider range of users to conduct commercially relevant data analytics without relying on specialists in the field data analytics specialists and at much lower cost than the conventional approach.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

FIG. 10 is an example of an ad-hoc user interface displayed by the natural language processing system.

FIG. 11 is an example of an ad-hoc query history user interface displayed by the natural language processing system.

FIG. 13 is an example of an ad-hoc query variation user interface displayed by the natural language processing system.

FIG. 15 is an example of an ad-hoc store audit management user interface displayed by the natural language processing system.

DETAILED DESCRIPTION

Figure 1:
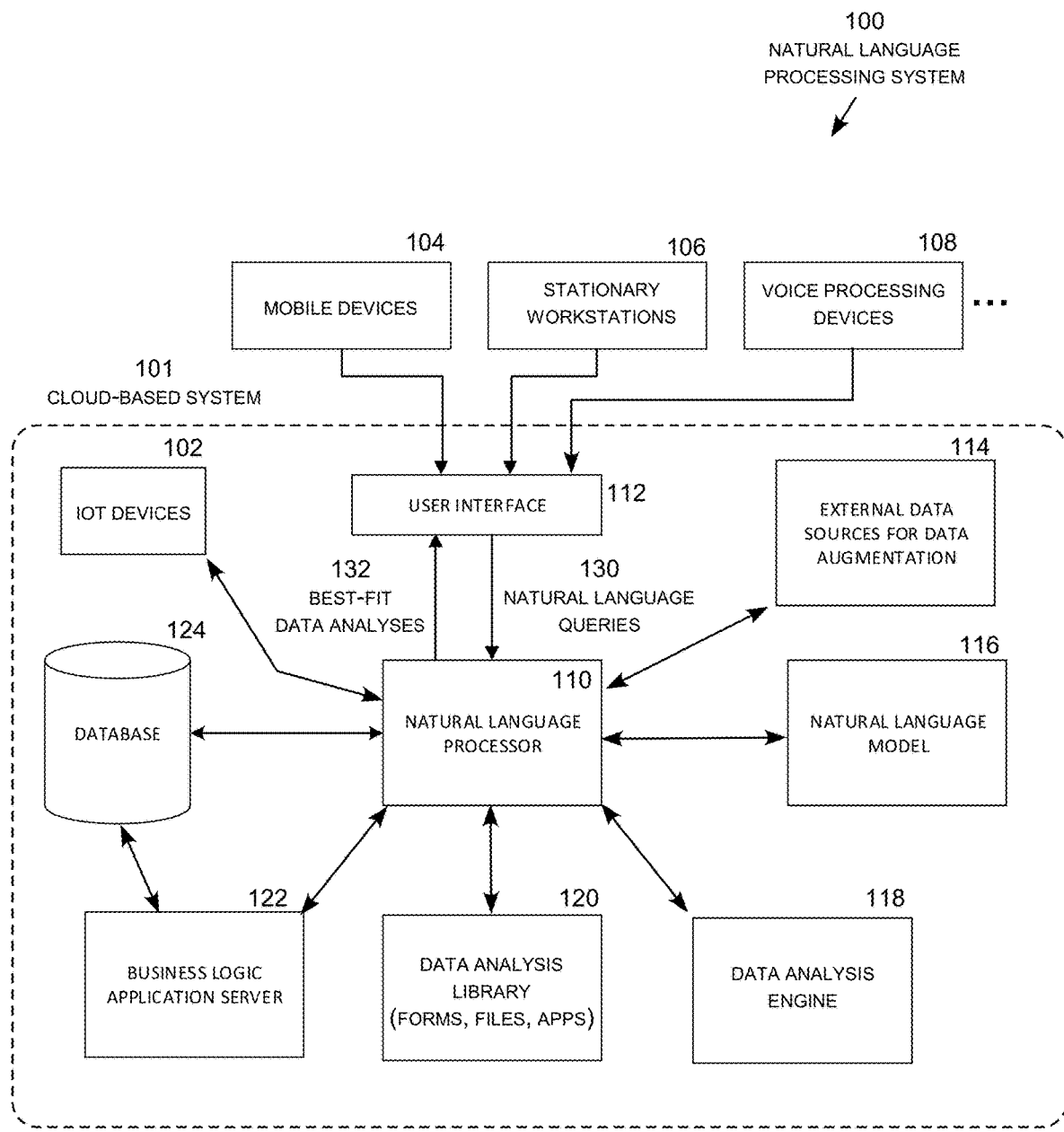
FIG. 1 is a functional block diagram of a natural language processing system.

The present invention may be embodied in a natural language processing system that conducts user interaction to identify and refine requests for data analyses, and automatically conducts data mining and prepares data visualizations in response to natural language queries. The system may conduct an iterative prompt-and-response natural language conversation with user to:
(a) identify data analysis requests,
(b) clarify and further develop the requests,
(c) conduct data mining responsive to the requests,
(d) prepare intelligently formatted data visualizations,
(e) present the data visualizations,
(f) obtain feedback from the user regarding the data visualizations,
(g) rank and present alternative data visualization of the same responsive data in different ranked-choice formats,
(h) repeat the process to further define and refine the requested data analyses.

Embodiments of the natural language processing system further operational to use natural language prompt-and-response commands to tailored to:
(a) identify actionable data analysis commands,
(b) distinguish between single-parameter and multi-parameter data requests,
(c) identify data mining operations that are likely missing some relevant data,
(d) identify potential locations of potentially relevant data,
(e) prompt the user to request data augmentation to supply the likely missing data,
(f) suggest specific data augmentation tasks,
(g) conduct approved data augmentation commands;
(h) intelligently format visualizations of the augmented data analysis request,
(i) present the visualizations of the augmented data analysis request to the user,
(j) further define and refine the augmented data analysis through natural language prompt-and-response conversation with the user.

Additional embodiments of the natural language processing system may be additionally or alternatively operational to use natural language prompt-and-response commands to tailored to:
(a) identify likely outdated or inaccurate data obtained through a data mining operation,
(b) prompt the user to request an update of the data analysis request,
(c) conduct approved data analysis updates;
(d) intelligently format visualizations of the updated data analysis request,
(e) present the visualizations of the updated data analysis request to the user,
(f) further define and refine the updated data analysis through natural language prompt-and-response conversation with the user.

Additional embodiments of the natural language processing system may be additionally or alternatively operational to:
(a) identify a multi-parameter data analysis request;
(b) determine a common range dimension for the multiple data parameters requested,
(c) align the multiple data parameters on the common range dimension,
(d) scale the orthogonal common ranges to fill the orthogonal data ranges on the same orthogonal scale, or on multiple aligned orthogonal scales (see U.S. Pat. No. 10,600,216)
(e) intelligently format visualizations of the multi-parameter data analysis request,
(f) present the visualizations of the multi-parameter data analysis request to the user,
(g) further define and refine the multi-parameter data analysis through natural language prompt-and-response conversation with the user.

Additional embodiments of the natural language processing system may be additionally or alternatively operational to translate natural language commands into computer-executable commands, such as but not limited to computer executable commands in SQL, JSON, XML, HTML, JAVA, C, C-sharp, python, JavaScript and other structured software codes. A representative embodiment includes a method and system leveraging trained neural network language model that converts between these different languages, and others, to provide on demand extensions and customizations in a business workflow and data collection and management application systems where data are describable as one or more standalone or interconnected relational database records.

Natural language processing has been used for a variety of applications, such as controlling search engines, household lighting and appliances, music selection, and so forth. Despite the popularity of natural language processing for these tasks for general consumers, similar development has not occurred in the field of data analytics for professional and business users. This is due, at least in part, to higher levels of complexity in data mining and visualization required to conduct commercially useful data analytics.

The present invention addresses these shortcomings through a natural language processing system that conducts user interaction to identify and refine requests for data analyses, and return responsive data visualizations in response to natural language queries. The system prompts the user at multiple steps in the analytical process to refine the data mining, data selection, and data visualization features of a data analytical task. The system allows the user to view multiple visualization for the defined task allowing the user to select among a variety of responsive analytical responses for the same natural language query.

The system greatly improves the ease of use, intuitiveness, variety, and responsiveness of the data analytics system by converting natural language requests into requests for data analyses. This allows a much wider range of users to conduct commercially relevant data analytics without relying on specialists in the field data analytics specialists and at much lower cost than the conventional approach.

For example, traditional language model is used in various business applications to improve or generate texts for business communication from the point of view of the certain role of users. For example, for doing commands such as "write a product summary from the perspective of a sales manager", or "summarize this article in 1 paragraph for inclusion into the list of topics", etc.

However, the trained language model can be used not only to produce or analyze text as would be its typical use case scenario above but also to convert between natural and structure languages, such as human language and SQL commands, JSON, XML, HTML, JAVA, C, C-sharp, python, JavaScript and similar, in such a way effectively extracting pertinent information from the request formed in natural human sentence and as a result returning a statement that can be sent to computer system such as SQL Server processor to produce the results. System components such as IoT controllers, dashboard analysis widgets, navigation interface, analysis of the input, etc. are all computer system elements that can be ad hoc extended using this functionality. This methodology is also useful for analyzing and interacting with time series databases, for example a database containing data captured from IoT sensors or industrial machinery.

The novel way of combining language model capability and set computer components in such a way allows on-demand runtime changes in the places where without language model integration the user would need to request a change to be programmed into the business analysis and flow system.

The present document describes preferred embodiments in which the language capability enrichment is added to a preset table that displays list of records (whether raw or already filtered, original or preprocessed via aggregation or similar statistical or mathematical means) to help user do ad-hoc analysis, narrowing or management of the data and display it in one of the selected formats that is inferred by the language model from the user natural language request or perform ad-hoc updates inferred from the natural language query on the data redirecting the updates where necessary to the logical business flow system commands.

It is understood by those skilled in art that there may be multiple possible ways to integrate the language model capability that helps with data query and analysis in a business flow automation and analysis system, for example as adding the capability to lists of records (views), to dashboard tables, to visual charts in visualization graphs as well as when entering data into the fields that accept multiple records. It is also understood that even though the Preferred embodiment uses SQL as a model language it also applies to other structured machine language outputs such as XML, JSON, JAVA, C, C-sharp, python, JavaScript declarative or procedural programming languages, etc.

The embodiments described in this specification demonstrate illustrative ways to use the invention based on the example entities, such as customers, actuators, auditors, etc. It is understood that these specific entities and subjects are just use case examples for demonstration purposes and that the system and method described is universal and can operate with any entities and subjects of a business application.

A representative embodiment utilizes an ad-hoc query customization and language model system in which the language model is used to analyze multiple natural language requests made by system users. Natural language transcription is used first to return the type of presentation the user would like to see as well as the query to filter the data and summarization feature to present results if necessary as well as expand into text commands to help user verify the rendered query command. The preferred embodiment can be performed, for example, using Open AI Chat GPT using davinci-text-0003 language model. It is understood that the same method can be implemented using other trained language models that satisfy the requirements of language transcription. The resulting implementation can be done in one language model communication session that gets configured to provide responses to each of the questions with prompts after receiving the response to the previous request or multiple language model communication sessions may be reused—one or more analyzing request for each task, for example a session that is being kept open between different requests to return the type of presentation and unique one time use session for generating structured query response based on specific relational database model supplied.

Another embodiment illustrates how the same methodology documented for query customization can be adjusted to use the same technique for ad-hoc data modification.

Turning to the figures, reference will now be made in detail to specific representative embodiments of the invention. In general, the same or similar reference numerals are used in the drawings and the description to refer to the same or like parts or steps. The drawings are in simplified form and are not to precise scale unless specifically indicated. The words "couple," "adjacent" and similar terms do not necessarily denote direct and immediate connections, but also include connections through intermediate elements or devices. Certain descriptors, such "first" and "second," "top and bottom," "upper" and "lower," "inner" and "outer," "leading" and "trailing," "vertical" and "horizontal" or similar relative terms may be employed to differentiate structures from each other in representative embodiments shown in the figures. These descriptors are utilized as a matter of descriptive convenience and are not employed to implicitly limit the invention to any particular position or orientation.

FIG. 1 is a functional block diagram of a natural language data analysis, visualization and editing system (the "natural language processing system" or "system") 100. A cloud-based or self-managed system 101 including a natural language processor 110 that communicates a with a user interface 112 that receives user and machine input including natural language commands from a variety of sources represented by mobile devices (e.g., smartphones, laptop computers, tablets) 104, stationary workstations (e.g., desktop computers), voice processing devices 108, and the like. The user interface 112 passes natural language queries 130 received from the input devices 102-108 to the natural language processor 110, which interprets the natural language queries 130 to derive data requests from the natural language queries and returns best-fit data analyses 132 in response to derived data requests. The natural language processor 110 may reach out to a number of data resources to obtain source data and report formats for the best-fit data analyses 132 including external data sources for data augmentation 114 (e.g., online search engines, online literature repositories, scientific databases, etc.), one or more natural language models represented by the naturel language model 116, one or more data analysis engines represented by the data analysis engine 118, one or more data analysis libraries represented by the data analysis libraries 120, one or more business logic application servers represented by the business logic application server 122, which may communicate directly or indirectly with or more databases represented by the database 124 and one or more internet-of-things ("JOT") devices 102. Basically, as described more fully below, the cloud-based or self-managed system 101 in natural language conversations with human system users to derive, interpret, refine and respond to data requests received through the natural language including displaying data results in a variety for formats, such as tables and charts, which may include multiple parameters displayed on common coordinates to facilitate visualization for the data results. The cloud-based or self-managed system 101 has, among other capabilities, the ability to create new software language commands, new data analyses, edit preexisting data, and combine data analyses not previously combined to facilitate visualization for the data results, as the data requests are developed, verified and refined through iterative natural language communications with the human system users seeking the specific data analyses.

Figure 2:
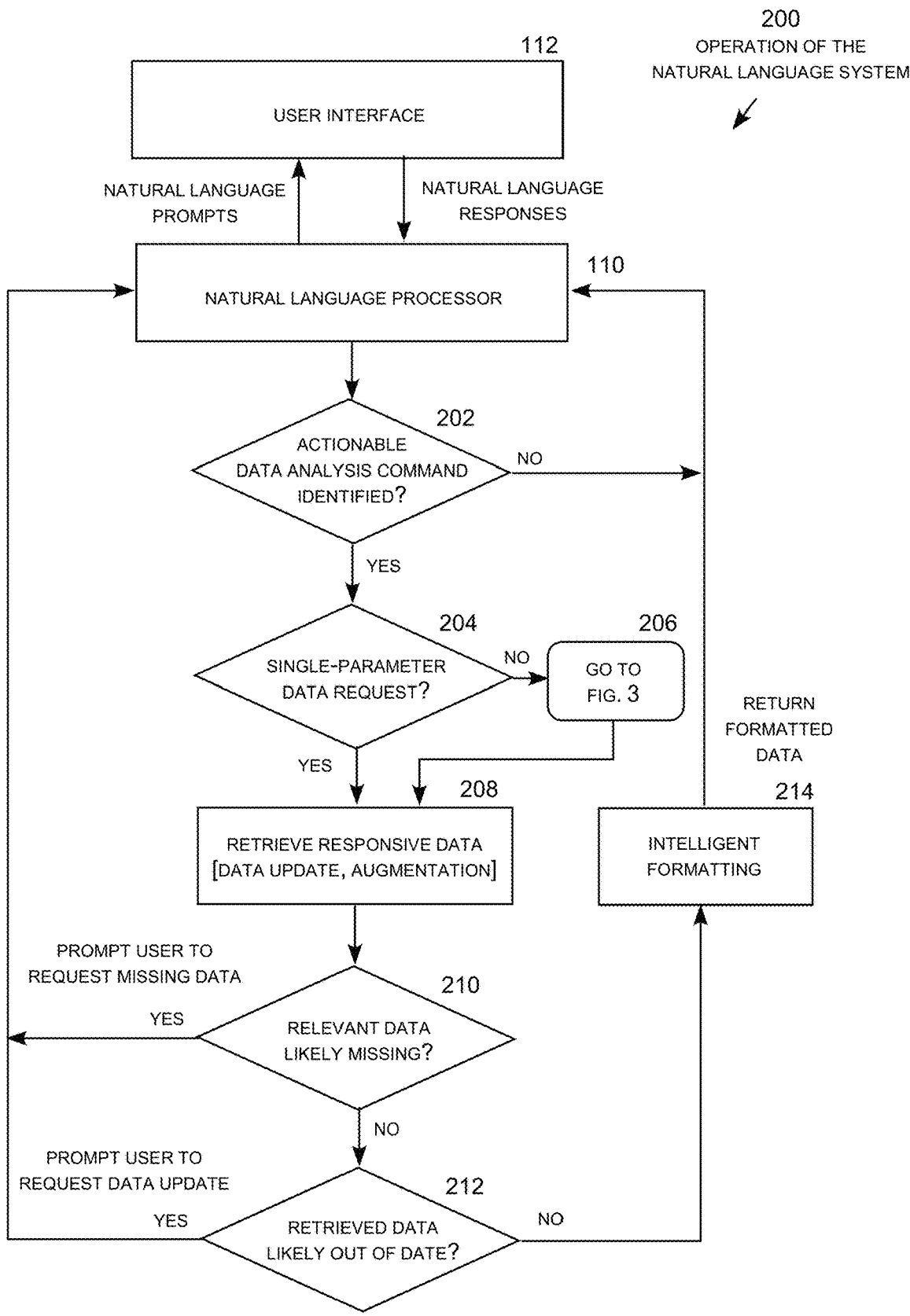
FIG. 2 is a logic flow diagram for operating the natural language processing system.

FIG. 2 is a logic flow diagram 200 for operating the system 100. Referring again to FIG., the user interface 112 exchanges natural language prompts and natural language responses with the natural language processor 110. To provide a representative example of this process, in step 202 the natural language processor 110 determines whether an actional data analysis command has been received. If the natural language processor 110 determines that an actionable data analysis command has been received, the "yes" branch is followed from step 202 to step 204, in which the natural language processor 110 determines whether the actionable data analysis command is a single parameter data request. If the actionable data analysis command is not a single parameter data request, the "no" branch is followed from step 204 to step 206, which is described further with reference to FIG. 3.

The language model 116 is pre-trained to analyze expressions in multiple languages and correlation of use between them in different contexts. This includes both natural human languages and computer languages including SQL and other structured languages. Embodiments of the present invention leverages this context-sensitive capability to convert between languages to arrange user interaction where user in the result is doing ad-hoc structured language queries without knowing anything about the underlying programming language model. The specific interaction examples described in this specification address inherent language model deficiencies and to obtaining reliable, verifiable and repeatable results for data mining as per what the human user intended to obtain, instead of obtaining a result that may be semantically similar to the request in natural language but may not be accurate for the purpose intended by the human user requesting the result. The additional steps and algorithms disclosed in this specification outline a way to arrange such natural language interaction along with the additional configurations and steps to be taken by the business application that aims to use language model for data mining and data management. The examples provided below include actual request/response sessions completed with ChatGPT that illustrate the described approach to using the language model for arranging natural language interface for business application access as well as the improved results which can be obtained with the aid of the compensation mechanisms disclosed in the specification.

If the actionable data analysis command is a single parameter data request, the "yes" branch is followed from step 204 to step 208, in which the natural language processor 110 retrieves data responsive to the single parameter data request, which may involve data augmentation, such as obtaining data from third-party resources responsive to the data request. Step 208 it followed by step 210, in which the natural language processor 110 determines whether data responsive to the data request is likely missing. If data responsive to the data request is likely missing, the "yes" branch is followed from step 210 to block 110 in which the natural language processor 110 provides the user with a natural language prompt to request missing data. If the data responsive to the data request is not likely missing, the "no" branch is followed from step 210 to step 212, in which the natural language processor 110 determines whether the retrieved data is likely out of date. If data responsive to the data request is likely out of date, the "yes" branch is followed from step 212 to block 110 in which the natural language processor 110 provides the user with a natural language prompt to request a data update. If the data responsive to the data request is not likely out of date, the "no" branch is followed from step 212 to step 214, in which the responsive data is formatted for presentation to the user.

The "no" branch from step 202 is likewise followed to step 214, in which the responsive data is formatted for presentation to the user, for example by selecting a line graph, pie-chart, map, table or other data presentation formatted considered to be best suited for the responsive data. The natural language processor 110 may present the various data formats in a rank list allowing the user to toggle among the data presentation formats and select a preferred type of data visualization.

Figure 3:
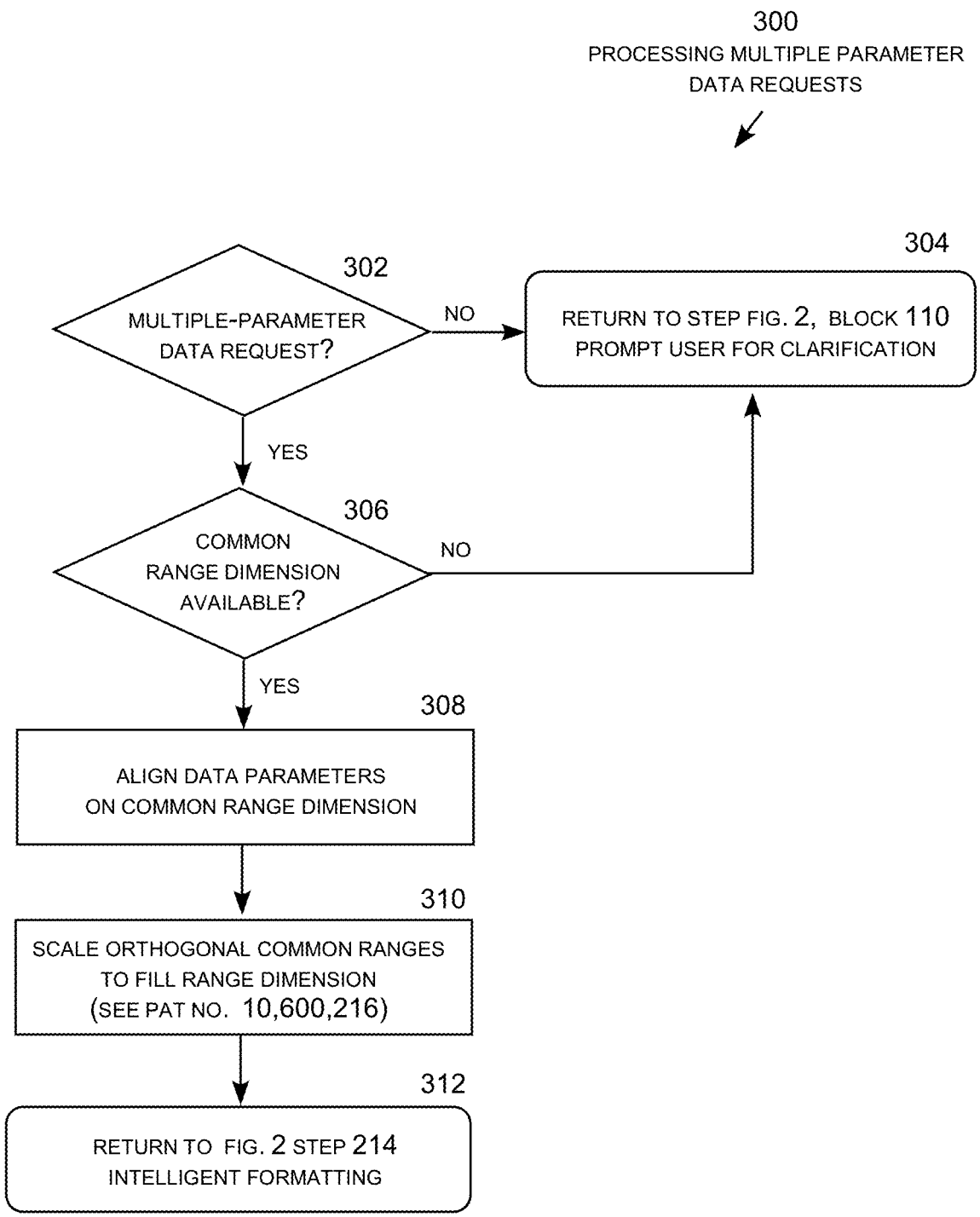
FIG. 3 is a logic flow diagram for processing multiple parameter data requests in the natural language processing system.

FIG. 3 is a logic flow diagram 300 for processing multiple parameter data requests in the natural language processor, which further develops step 208 on FIG. 2 when the natural language processor 110 determines that the actionable data request is a not a single parameter data request. In step 302, the natural language processor 110 determines whether the actionable data request is a multiple parameter data request. If the actionable data request is a not multiple parameter data request, the "no" branch is followed to step 304, in which the process returns to FIG. 2, block 110, in which the natural language processor 110 provides the user with a natural language request for clarification of the data request.

If the actionable data request is a multiple parameter data request, the "yes" branch is followed to step 306, in which the natural language processor 110 determines whether the multiple data parameters can be expresses on a common data range, such as a data coordinate in common in a coordinate system in which the multiple data parameters can be graphed. If the multiple data parameters cannot be expresses on a common data range, the "no" branch is followed to step 304, in which the process returns to FIG. 2, block 110, in which the natural language processor 110 provides the user with a natural language request for clarification of the data request. If the multiple data parameters cannot be expresses on a common data range, the "yes" branch is followed to step 308, in which the natural language processor 110 aligns the multiple data parameters on a common range dimension, such as a common coordinate of a coordinate system in which the multiple data parameters can be graphed.

Step 308 is followed by step 310, in which the natural language processor 110 scales orthogonal common data ranges to fill the range dimensions. Step 310 is followed by step 312, which returns to FIG. 2, step 214 for intelligent formatting of multiple data parameters for visualization by the user. In a Cartesian coordinate system, for example, this may include plotting all of the data parameters against the same "X" axis, while plotting each data parameter against a different "Y" axis, where each "Y" axis is scaled to substantially fill the visible data range. In addition, the multiple data parameters plotted against different "Y" axes may be further scaled so that "tick marks" for each data parameter coincide to assist in visualization of the data, as described in U.S. Pat. No. 10,600,216, which is incorporated by reference.

Figure 4:
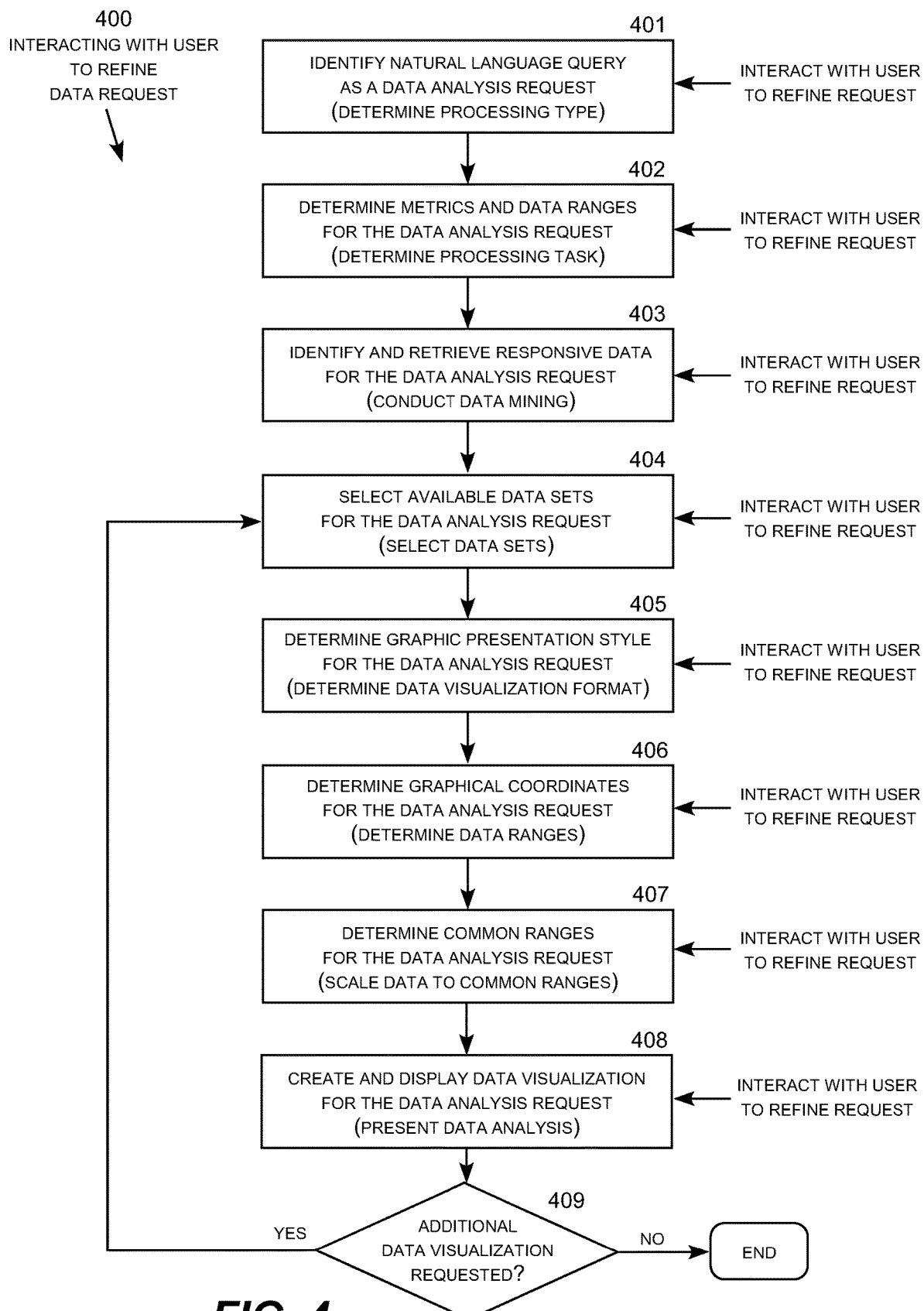
FIG. 4 is a logic flow diagram for prompting a user to refine a data request in the natural language processing system.

FIG. 4 is a logic flow diagram 400 for interacting with a user to refine a data request in the natural language processor which may need to be conducted at the various steps of the taught method. In step 401, the natural language processor 110 receives requests from the human user and applies natural language prompts to configure the system to identify a natural language query as a data analysis request. Step 401 is designed to proceed to step 402 automatically without requiring further clarification from the user, but if the user input is ambiguous may prompt the user to clarify the request. In step 402, the natural language processor 110 determines metric and data ranges for the data analysis request from the original human language request and proceeds to step 403 automatically, it may decide to interact with the human user with natural language prompts if additional clarification is needed. In all further steps of this diagram it is understood that where a block has "Interact with user" option it means the back interaction may be initiated but not required. In step 403, the natural language processor 110 identify responsive data for the data analysis request, which the natural language processor 110 retrieves and may display to the user for verification. In step 404, the natural language processor 110 provides the human user with natural language prompts to select among available data sets for the data analysis request if multiple datasets are present and the list cannot be identified from the original request completely. In step 405, the natural language processor 110 determines a graphic presentation style for the data analysis request using algorithm detailed in FIG. 6. In step 406, the natural language processor 110 determines graphical coordinates for the data analysis request. In step 407, the natural language processor 110 may automatically detect or provide the human user with natural language prompts to determine common ranges for the data parameters subject to the data analysis request as described in FIG. 5A-C. In step 408, the natural language processor 110 creates and displays data visualizations for the data analysis request and provides the human user with natural language prompts to review, verify or change the requested data analysis or visualizations of the responsive data as detailed in algorithms FIG. 7, 8, 9. In step 409, the natural language processor 110 provides the human user with natural language prompts to request additional data visualizations. If the user requests additional data visualizations, the "yes" branch loops to step 404, in which the user selects available data sets for the data analysis. If the user does not request additional data visualizations, the "no" branch is followed to the "end" step.

One of the examples of how this taught method of processing may be used to address the ad-hoc customization of the data system functionality is as follows: The user opens a natural language prompt field in the system and requests "Show me a list of our top customers from 2022". The natural language system then will automatically be able to identify that the request type is a data analysis query not a data alteration from the keyword "show", presentation type is a table from a "list" keyword, and that the data should come from a Customer table that is stored inside the database attached to the said system and no external data sources thus automatically going through steps 401-405 without requiring interaction with the user in step 405 it will look into the customer table to see which property columns it has. For example let's assume the exemplary table has field names "saledate" and "saleamount". The analysis system will assume that the "top" request is to be completed by calculating the total sales that fall within the year period for the same customer thus selecting the monetary value measure. In step 407 the system determines that since only one property is requested no common measures are required and so it proceeds to step 408 where it executes the request it determined by converting the human language request to SQL language command generated by pre-trained natural language model 116 to calculate total sales per year for each customer and then selects top 10 (assumed) customers by total sales and presents it in a table. At this point the system made a few assumptions that were not clear from the request so it presented to the user the exact summary of decisions made, and command executed in human simple summary language (obtained via using summarization feature of natural language model 116) allowing the user to intervene and provide clarification. The user can then review the description similar to the following: "The query first calculated total amount of sales for each customer that bought products in 2022 and then selects top 10 of those customers sorted in descending order by sales amount". For example, say, the user realized from that description that when he meant "top customer", he meant not the highest amount of sales but the most sales made, so he can select "reject" button and when prompted provide clarification "top customer is the one with most orders made. Please show only 5" and send this input to the system, the system will then use both original and new request together to adjust the results, specifically, in the data retrieval section and presents the altered results with the user again allowing him to confirm the correctness by including a new summary similar to this: "The query first calculated total number of sales for each customer that bought products in 2022 and then selects top 5 of those customers sorted in descending order by the total number of orders made". The user may accept the request at this point and thus since no requests made finish the session or the user may ask the system to adjust or add additional visualizations to the same result by combining with additional tables or even external data sources. This demonstrates how the system can provide useful deterministic ad-hoc data analysis results with minimal user interaction from just a well-formed natural language request but with full user control of what is done at each step of the algorithm if desired.

Figure 5A:
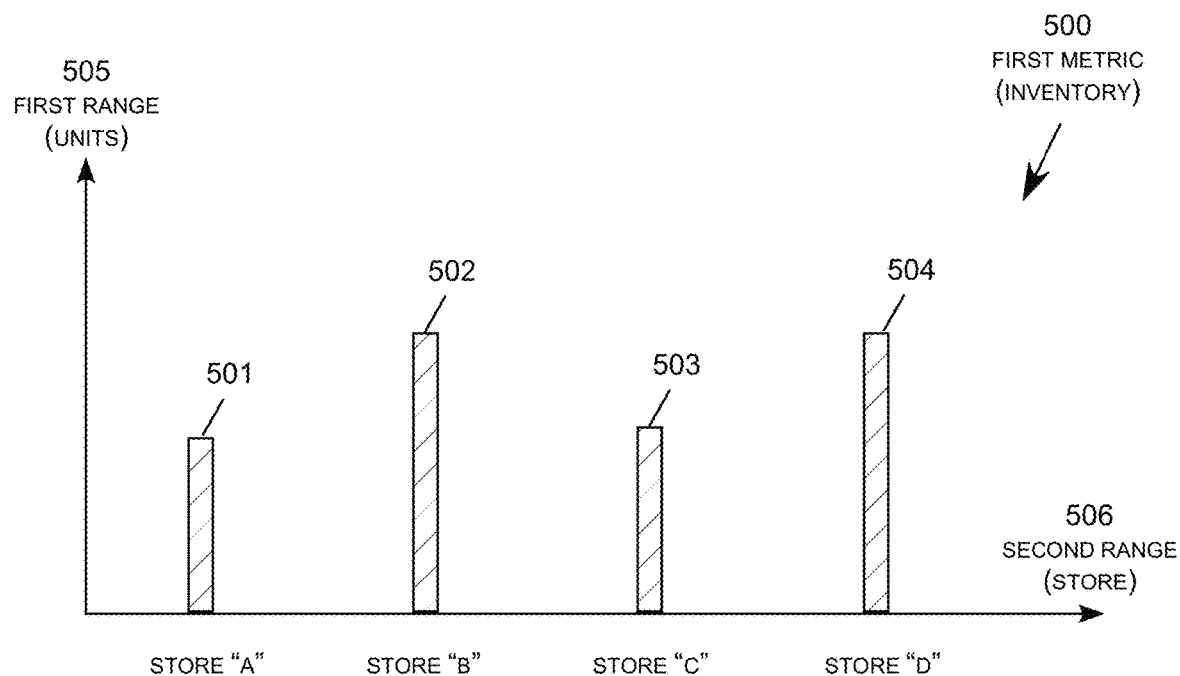
FIG. 5A is a first bar chart representing a visualization of a first data metric by the natural language processing system.
Figure 5B:
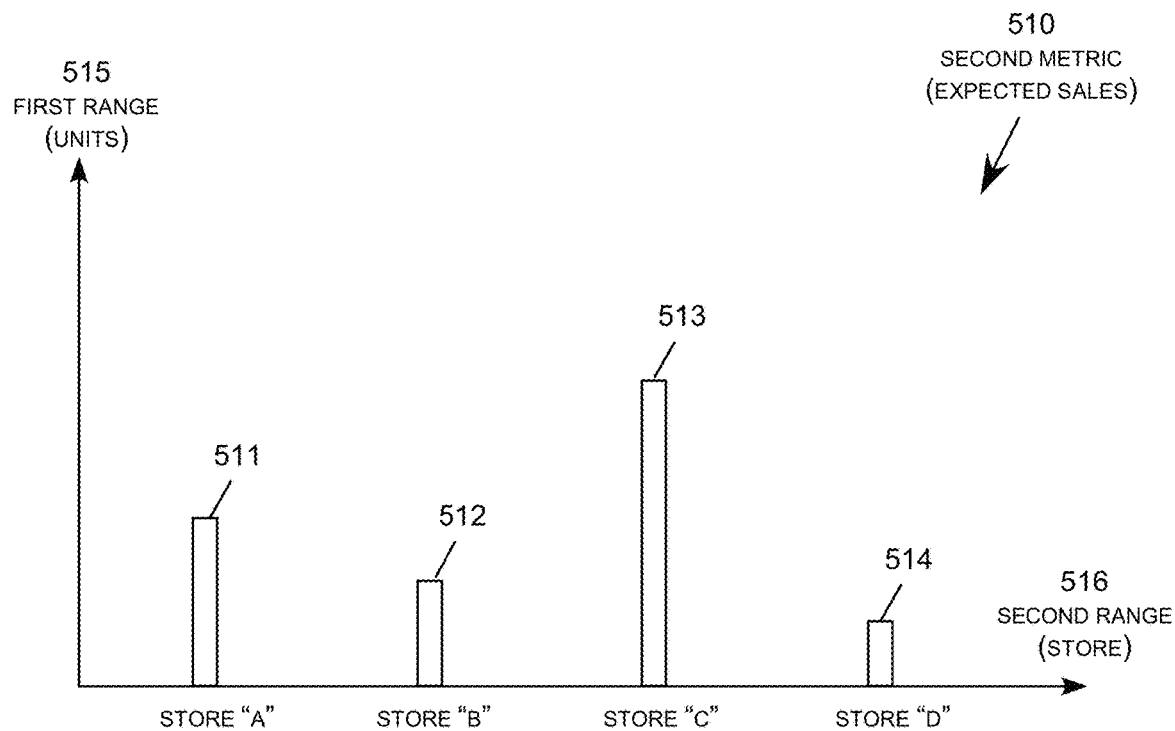
FIG. 5B is a second bar chart representing a visualization of a second data metric by the natural language processing system.
Figure 5C:
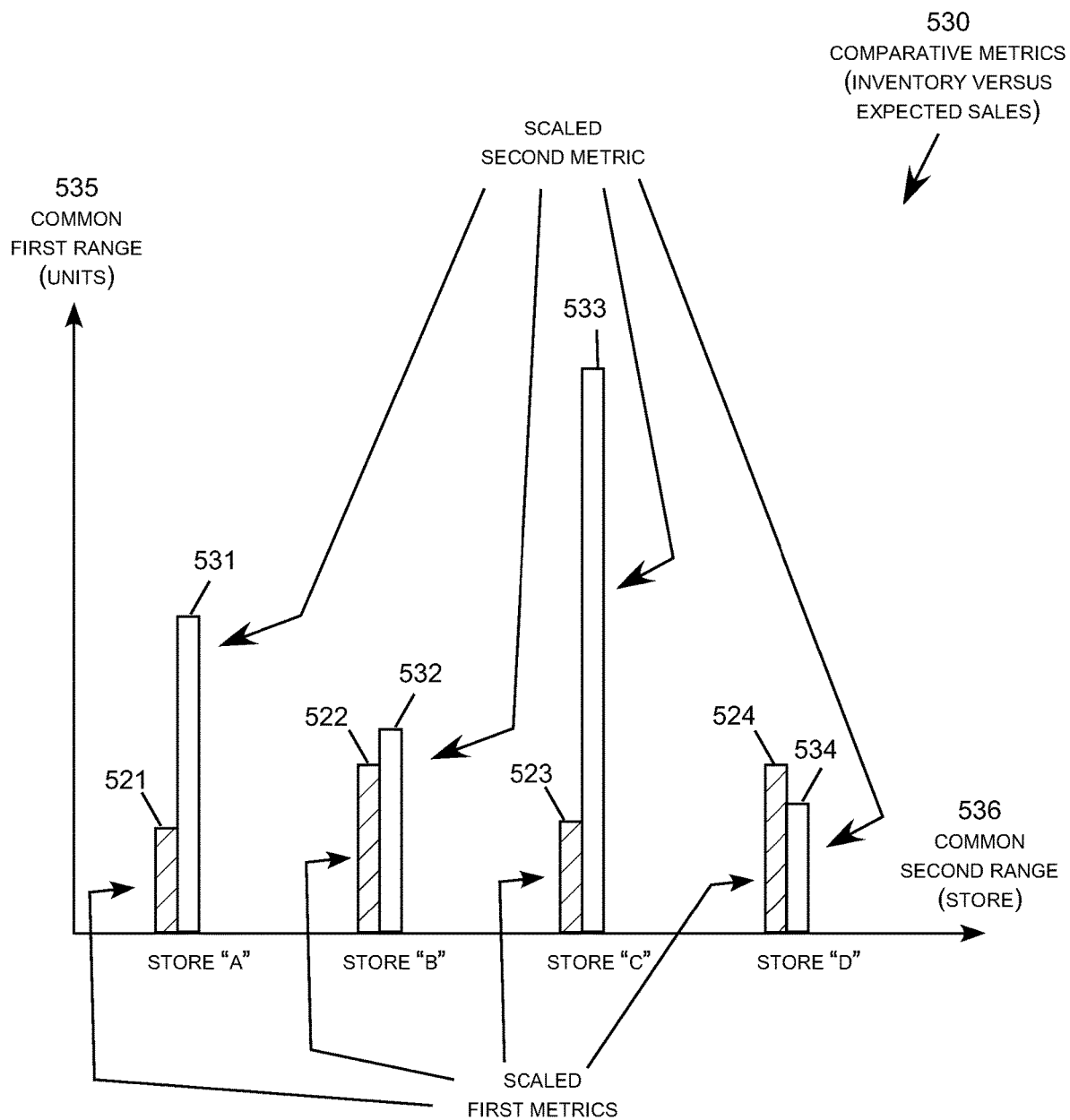
FIG. 5C is a third bar chart representing a visualization of a the first and second data metrics on a common range scales by the natural language processing system.

FIGS. 5A-5C are first bar chart illustrating an example visualization of multiple data metrics on common range scales. This is a simplified example of more sophisticated data analyses that can be developed, visualized, refined and edited through natural language conversations between human users and the cloud-based or self-managed system 100. FIG. 5A shows a bar chart 500 of a first metric, in this example the inventory of a particular item at multiple stores "A" through "D." The "X" axis represents the stores "A" through "D" while the "Y" axis represents the number of units in inventory, namely bar 501 represents the inventory at store "A," bar 502 represents the inventory at store "B," bar 503 represents the inventory at store "C," and bar 504 represents the inventory at store "D." FIG. 5B shows a bar chart 510 of a second metric, in this example the expected sales of the particular item at the stores "A" through "D." The "X" axis represents the stores "A" through "D" while the "Y" axis represents expected number of units that will be sold, namely bar 511 represents the expected sales at store "A," bar 512 represents the expected sale at store "B," bar 513 represents the expected sales at store "C," and bar 514 represents the expected sales at store "D."

FIGS. 5A and 5B have the common data range "stores" for the "X" axis allowing them to be visualized on an common bar chart. The natural language processor 110 therefore scales the "Y" range for the parameters to have the same scale, units in this example, so that the bar chart 5C visualizes the data for both parameters on a common bar chart. This is shown in FIG. 5C, which includes the common "Y" data range (units) 535 and the common "X" data range (stores) 536 with the data metric scaled to the common "Y" range. That is, the bar 521 represents the number of units in inventory at store "A" scaled to the common "Y" data range 535 plotted alongside the bar 531 representing the expected sales at store "A" also scaled to the common "Y" data range. The bar 522 represents the number of units in inventory at store "B" scaled to the common "Y" data range 535 plotted alongside the bar 532 representing the expected sales at store "B" also scaled to the common "Y" data range. The bar 523 represents the number of units in inventory at store "C" scaled to the common "Y" data range 535 plotted alongside the bar 533 represents the expected sales at store "C" also scaled to the common "Y" data range. The bar 524 represents the number of units in inventory at store "D" scaled to the common "Y" data range 535 plotted alongside the bar 534 represents the expected sales at store "D" also scaled to the common "Y" data range. This provides the useful visualization comparing the inventory versus expected sales on a store-by-store basis. The natural language conversation including the series of prompts between the human user and the natural language processor 110 served to define, refine and verify that this is the data analysis the user was interested in receiving.

Figure 6:
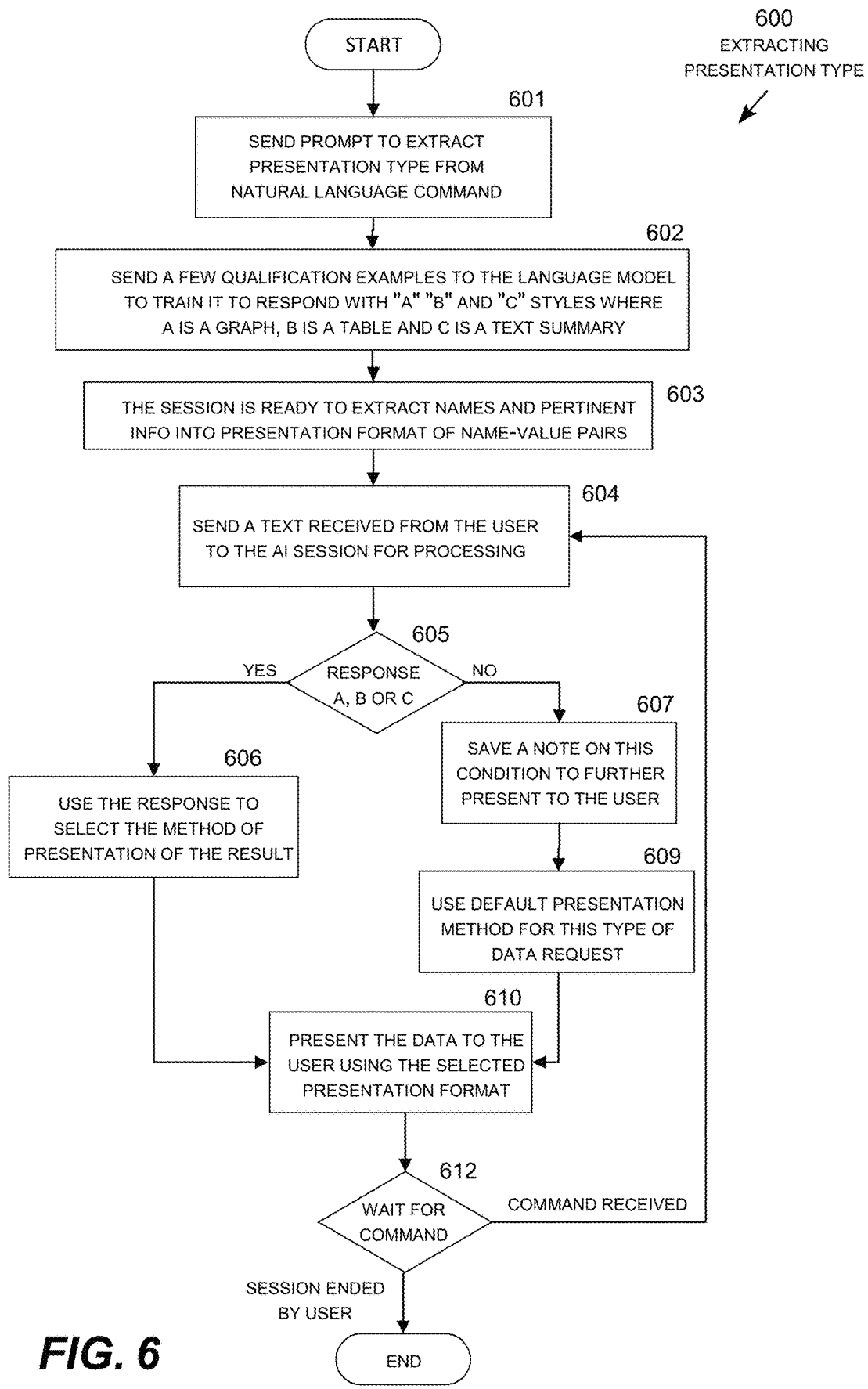
FIG. 6 is a logic flow diagram for extracting a presentation type from a data request by the natural language processing system.

FIG. 6 is a logic flow diagram 600 for extracting a presentation type from a data request by the natural language processor 110. In step 601, the natural language processor 110 starts with a natural language prompt to a human user to prompt the user extract a presentation type form a natural commend. For example, the natural language processor 110 may display a text message, play an audio message, present a multi-media combination, prompting the user the describe or select a presentation type for a data analysis. This step may be omitted if the user has already provided the request command in an earlier steps of the interaction. Step 601 is followed by step 602, in which the natural language processor 110 sends a few qualification examples to the language model 116 to train the language model to automatically respond by presenting data ranged in selected presentation styles. For example, style "A" may be a graph, style "B" may be a table, and style "C" may be a text summary. Step 602 is followed by step 602, in which the natural language processor 110 prepares a session that is ready to extract names and pertinent associated information and place the name-value pairs into the predefined styles "A" (graph), "B" (table) and "C" (text summary). Step 603 is followed by step 604, in which the natural language processor 110 received as naturel language text string from the user and sends t to the artificial intelligence ("AI") session for processing.

Step 604 is followed by step 605, in which the natural language processor 110 receives a response form the natural language model 116 session that determines whether it corresponds to a "A" (graph), "B" (table) or "C" (text summary). If the response corresponds to a "A" (graph), "B" (table) or "C" (text summary), the "yes" branch is followed to step 606, in which the natural language processor 110 selects among the available presentation types to present to the user. Step 606 is followed by step 610, in which the natural language processor 110 presents the data analysis in the selected format.

If the response does not correspond to a "A" (graph), "B" (table) or "C" (text summary), the "no" branch is followed to step 607, in which the natural language processor 110 saves a note concerning this condition for presentation to the user. Step 607 is followed by step 608, in which the natural language processor 110 used a default presentation style for this type of data request. Step 609 is followed by step 610, in which the natural language processor 110 presents the data analysis in the selected format. Step 610 is followed by step 612, in which the natural language processor 110 waits for a command from the user. If the natural language processor 110 receives a command from the user, the process continues to step 604 in which the natural language processor sends the received text to the natural language model 116 session for processing. If the user ends the session, the process continues to the "end" step.

Figure 7:
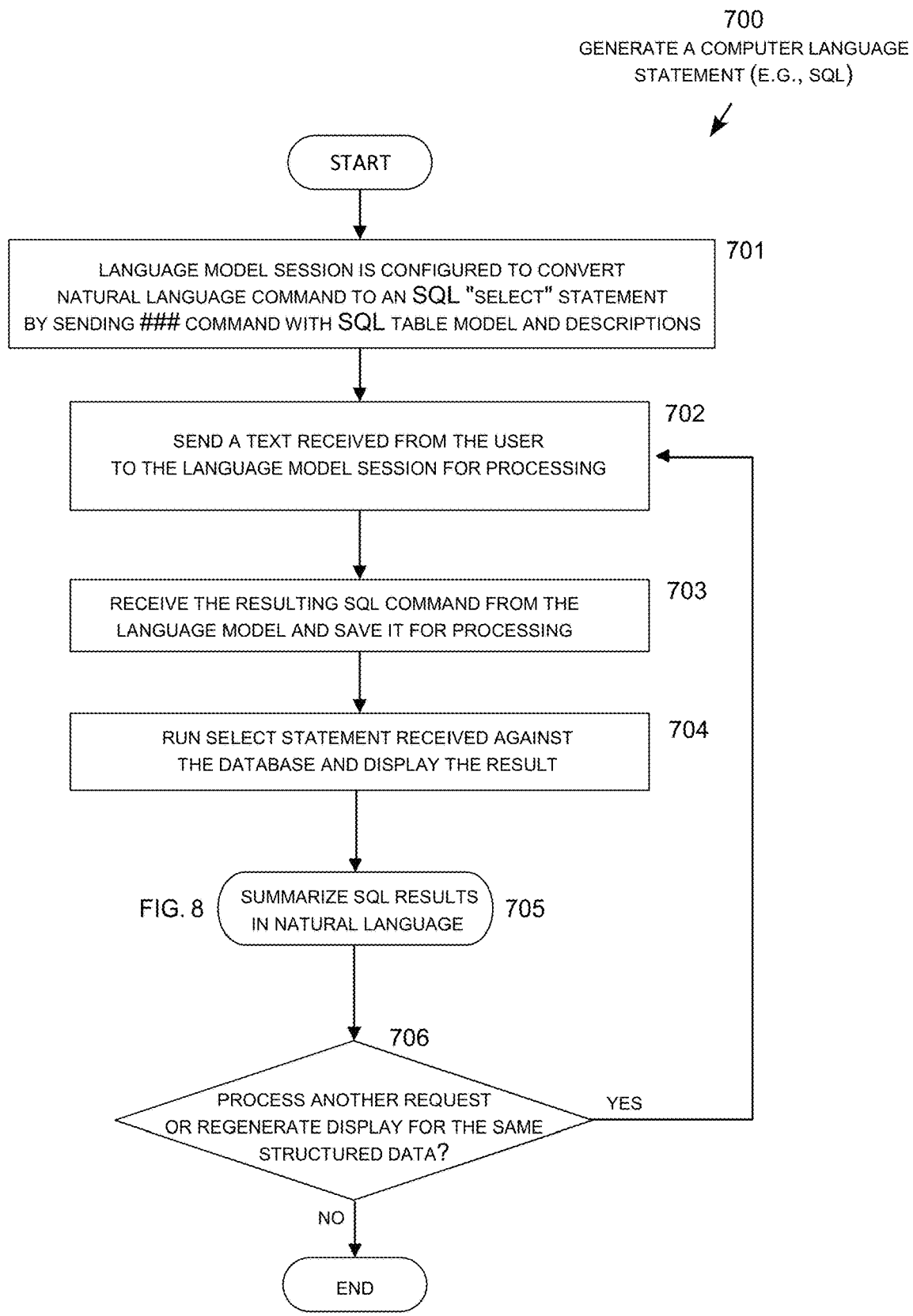
FIG. 7 is a logic flow diagram for generating a computer language statement by the natural language processing system.

FIG. 7 is a logic flow diagram 700 for generating a computer language statement by the natural language processor 116, which is in this example is an SQL command to provide a representative example. In step 701, the natural language processor 110 configures the language model 116 session to convert a natural language command to an SQL "select" statement by sending a "###" command with SQL table model and description to the natural language model 116. Step 701 is followed by step 702, in which the natural language processor 110 sends a text string received from the user to the natural language model 116 for processing. Step 702 is followed by step 703, in which the natural language processor 110 receives the resulting SQL command from the natural language model 116. Step 703 is followed by step 704, in which the natural language processor 110 runs the SQL statement received form the natural language model 116 against the database 124. Step 704 is followed by step 705, in which the natural language processor 110 summarizes the SQL results in natural language as described further with reference to FIG. 8. In case the of summary presentation format, the text summary is the results of the executed commands, which are also summarized in the user natural language by the language model 116. An example of such embodiment is illustrated in FIG. 10. Step 705 is followed by step 706, in which the natural language processor 110 determines whether it has another natural language request to process or a request to regenerate the display for the same structured data. If the natural language processor 110 has another natural language request to process or a request to regenerate the display for the same structured data, the "yes" branch is followed to step 702, in which it sends the natural language text string received from the user to the natural language model 116 for processing. If the natural language processor 110 does not have another natural language request to process or a request to regenerate the display for the same structured data, the "no" branch is followed to the "end" step.

Figure 8:
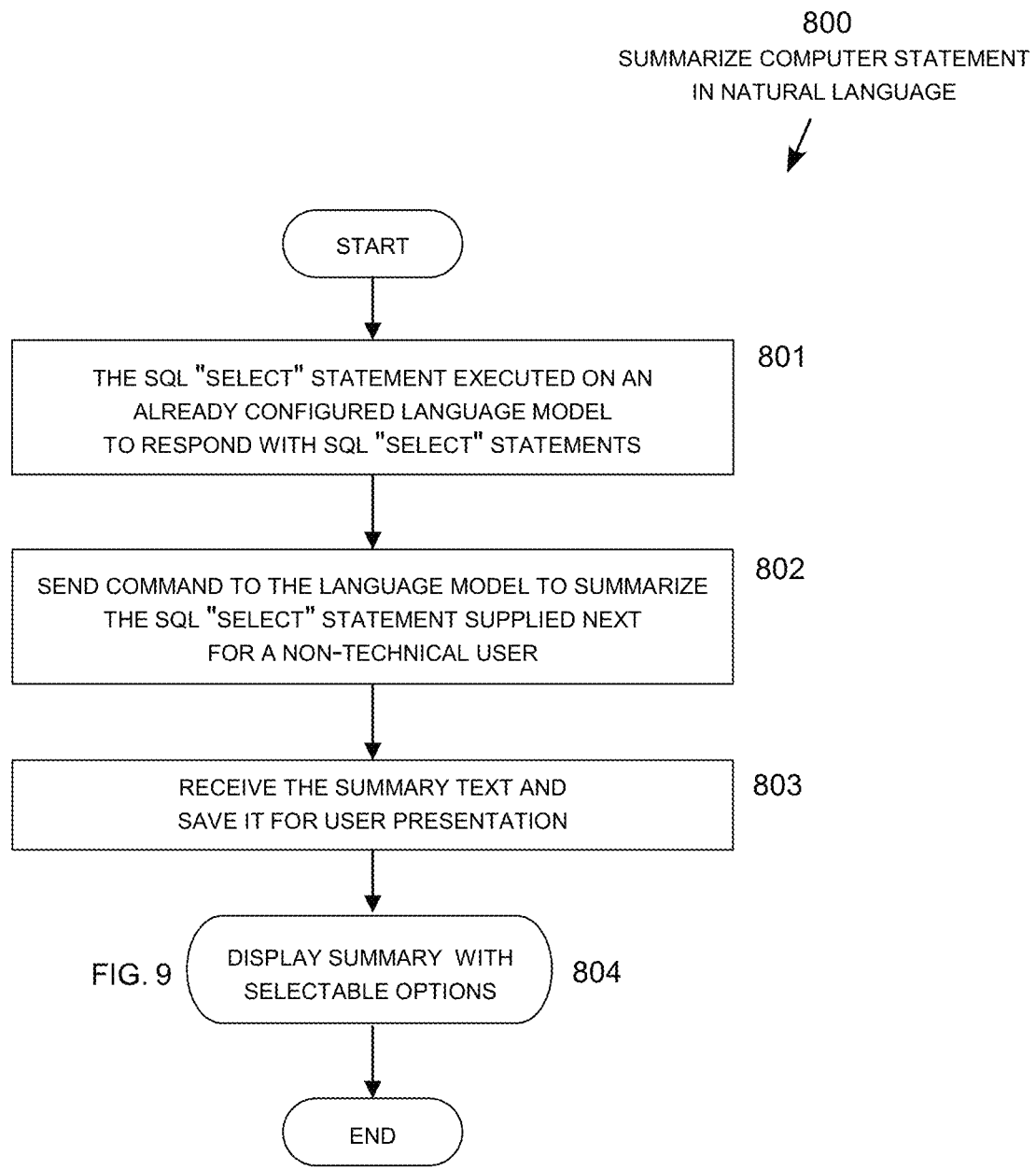
FIG. 8 is a logic flow diagram for summarizing a computer statement in natural language by the natural language processing system.

FIG. 8 is a logic flow diagram 800 for summarizing a computer statement in natural language. In step 801, the SQL "select" statement is executed on the language model 116, which is already configured to respond to natural language queries with SQL "select" statements. Step 801 is followed by step 802, in which the language system 110 sends the SQL "select" statement to the natural language model 116, which summarizes SQL "select" statement in natural language for a non-technical user. Step 802 is followed by step 803, in which the natural language processor 110 receives the natural language summary of the SQL "select" statement and saves it for presentation to the user. Step 803 is followed by step 804, in which the natural language processor 110 displays the natural language summary of the SQL "select" statement to the user with selectable options, as described further with reference to FIG. 9.

Figure 9:
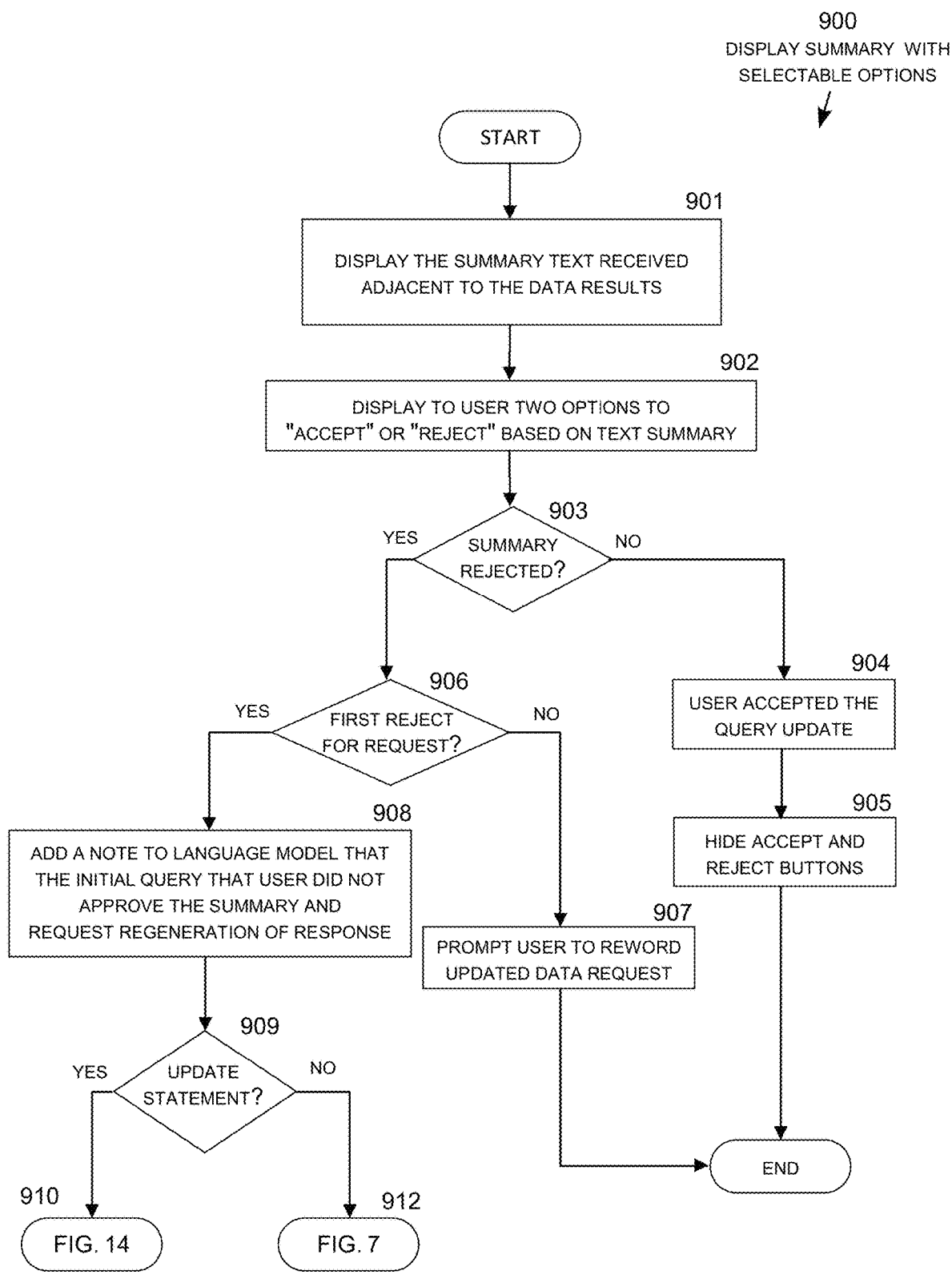
FIG. 9 is a logic flow diagram for extracting a displaying a summary with selectable options by the natural language processing system.

FIG. 9 is a logic flow diagram 900 for displaying a summary with selectable options by the natural language processor 110. FIGS. 10 and 11 are an examples of an user interfaces 1000 and 1100 displayed by the system 110. In step 901, the language system 110 displays the summary text describing the SQL statement executed received from the natural language model 116 to the user adjacent to the data results. Step 901 is followed by step 902, in which the natural language processor 110 displays "accept" or "reject" options to the user based on the text summary. Step 902 is followed by step 903, in which the natural language processor 110 determines whether the summary was rejected by the user. If the user did not reject the text summary, the "no" branch is followed to step 904, in which the natural language processor 110 records the user's acceptance. Step 904 is followed by step 905, in which the natural language processor 110 hides the "accept" and "reject" buttons. Step 906 is followed by the "end" step.

If the user rejected the text summary, the "yes" branch is followed from step 903 to step 906, in which the natural language processor 110 determines whether this is the first rejection. If this is not the first rejection, the "no" branch is followed to step 907, in which the natural language processor 110 prompts the user to reword an updated data request. Step 907 is followed by the "end" step. If this is the first rejection, the "yes" branch is followed to step 908, in which the natural language processor 110 adds a note to the language model 116 that the initial query that the user did not approve the summary and requests regeneration of the response by the natural language model. Step 908 is followed by step 909, in which the natural language processor 110 determines whether to update the SQL statement. If the natural language processor 110 needs to regenerate the statement then it follows to either step 910 or step 912. If the initial request was for data update, the "yes" branch is followed to step 910, which is described further with reference to FIG. 14. If the natural language processor 110 was executing request for data mining, the "no" branch is followed to step 912, which is described further with reference to FIG. 7.

Figure 12:
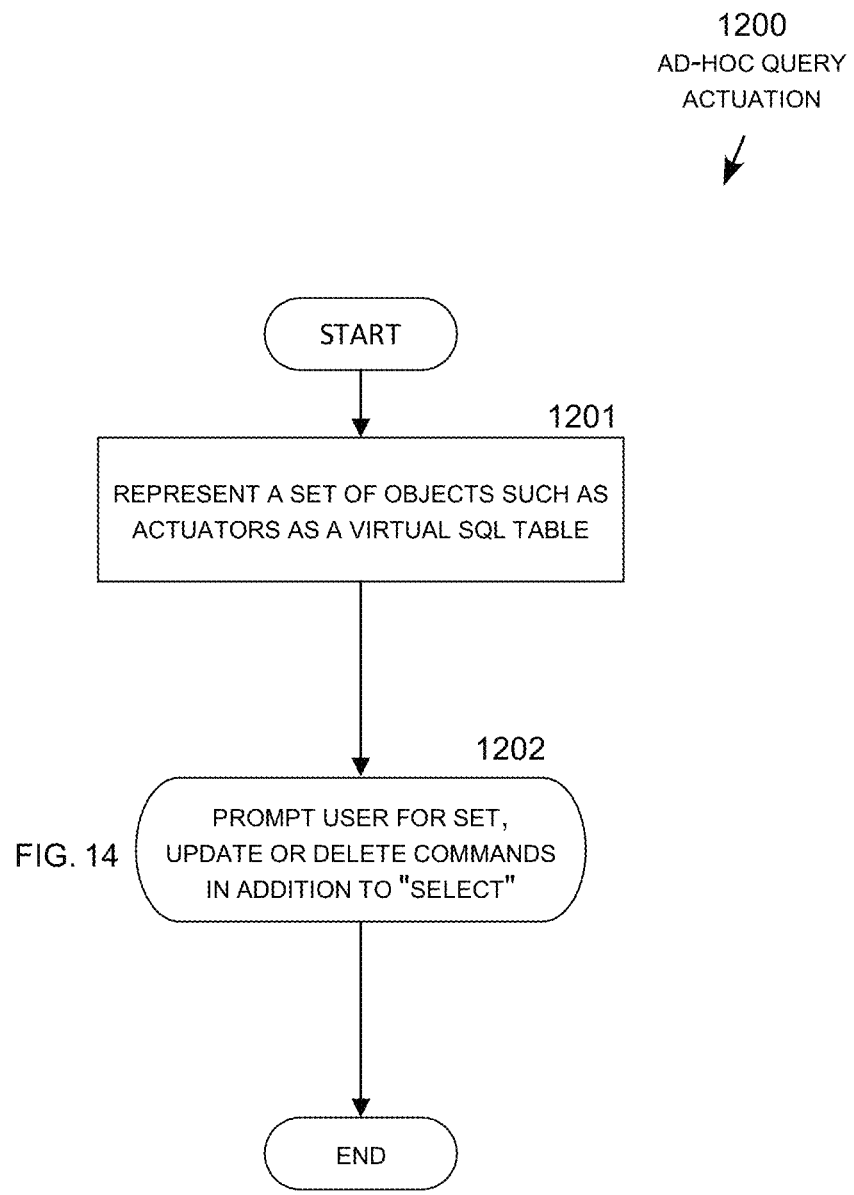
FIG. 12 a logic flow diagram for ad-hoc query actuation by the natural language processing system.

FIG. 12 a logic flow diagram 1200 for ad-hoc query actuation by the natural language processor 110. In step 1201, the natural language processor 110 represents a set of objects, in this example ad-hic query actuators, as a virtual SQL table. Step 1201 is followed by step 1202, in which the natural language processor 110 prompts the user for set, update or delete commands in addition to the SQL "select" command, which is described further with reference to FIG. 14. FIG. 13 is an example of an ad-hoc query variation user interface 1300 displayed by the natural language processor in addition to examples shown in FIG. 10 and FIG. 11.

Figure 14:
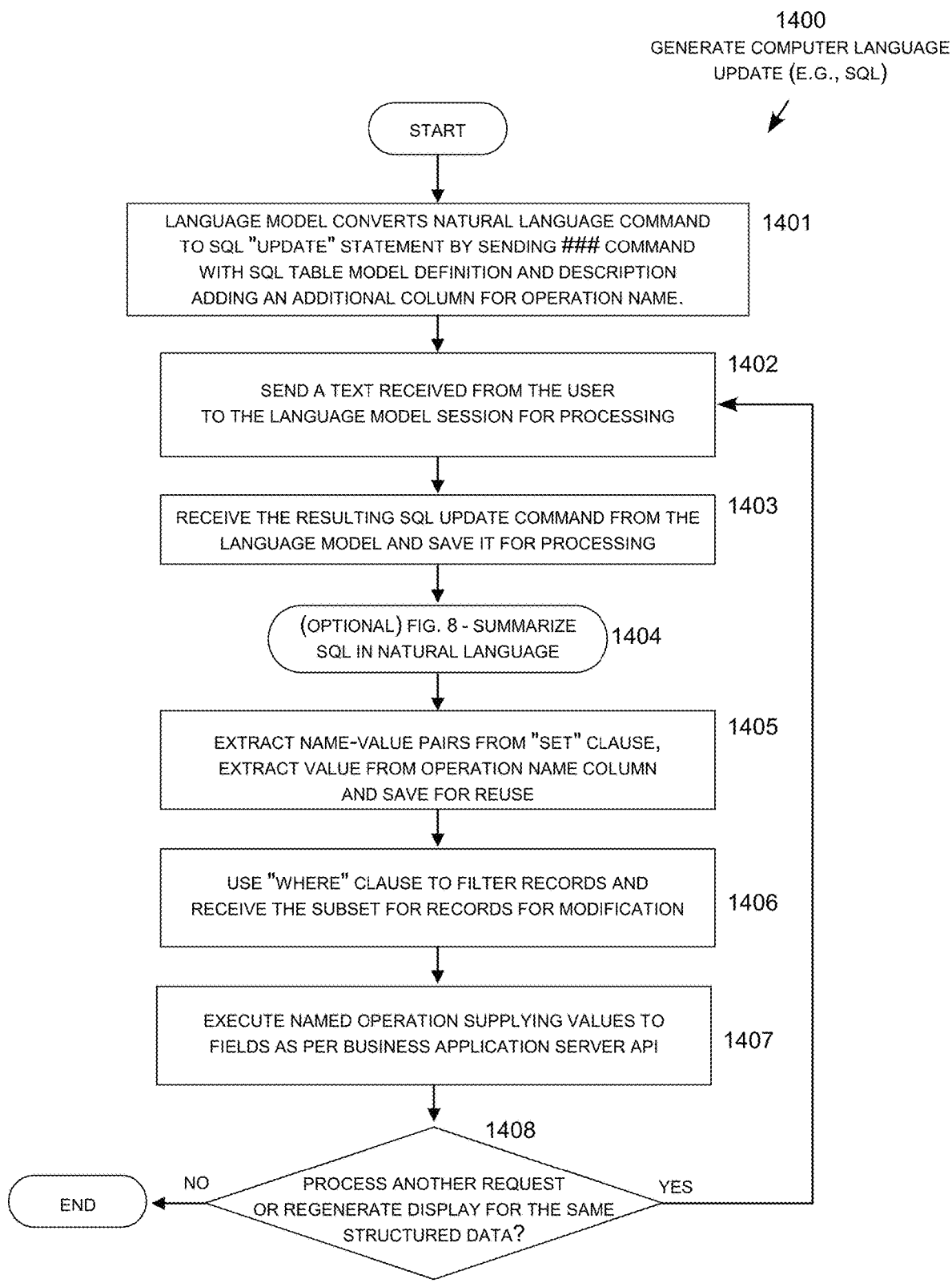
FIG. 14 is a logic flow diagram for generating a computer language update by the natural language processing system.

FIG. 14 is a logic flow diagram 1400 for generating an update computer language statement by the natural language processor, which is an SQL command to provide a representative example, FIG. 15 is an example of an ad-hoc store audit management user interface 1500 displayed by the natural language processor. In step 1401, the natural language processor 110 converts a natural language command to an SQL "update" statement by sending a "###" command with SQL table model and description adding an additional column for "operation name" to the natural language model 116. Step 1401 is followed by step 1402, in which the natural language processor 110 sends a text string received from the user to the natural language model 116 for processing. Step 1402 is followed by step 1403, in which the natural language processor 110 receives the resulting SQL command from the natural language model 116. Step 1403 is followed by step 1404, in which the natural language processor 110 optionally summarizes the SQL "update" command in natural language by means of sending it to language model 116 and presents it to the user as described further with reference to FIG. 8. Step 1404 is followed by step 1405, in which the natural language processor 110 extracts the name-value pairs from the "set" clause, extracts the value from the operation name column, and saves for reuse. Step 1405 is followed by step 1406, in which the natural language processor 110 uses the "where" clause to filter records using business system specific APIs for data access to records and receive the subset for record modification. Step 1406 is followed by step 1407 in which the named operation is executed in the business flow system using internal API supplying the extracted values into the named fields as necessary for the operation in leu of applying the update directly to the database tables. Step 1407 is followed by step 1408, in which the natural language processor 110 determines whether it has another natural language request to process or a request to regenerate the display for the same structured data. If the natural language processor 110 has another natural language request to process or a request to regenerate the display for the same structured data, the "yes" branch is followed to step 1402, in which it sends the natural language text string received from the user to the natural language model 116 for processing. If the natural language processor 110 does not have another natural language request to process or a request to regenerate the display for the same structured data, the "no" branch is followed to the "end" step.

Figure 16:
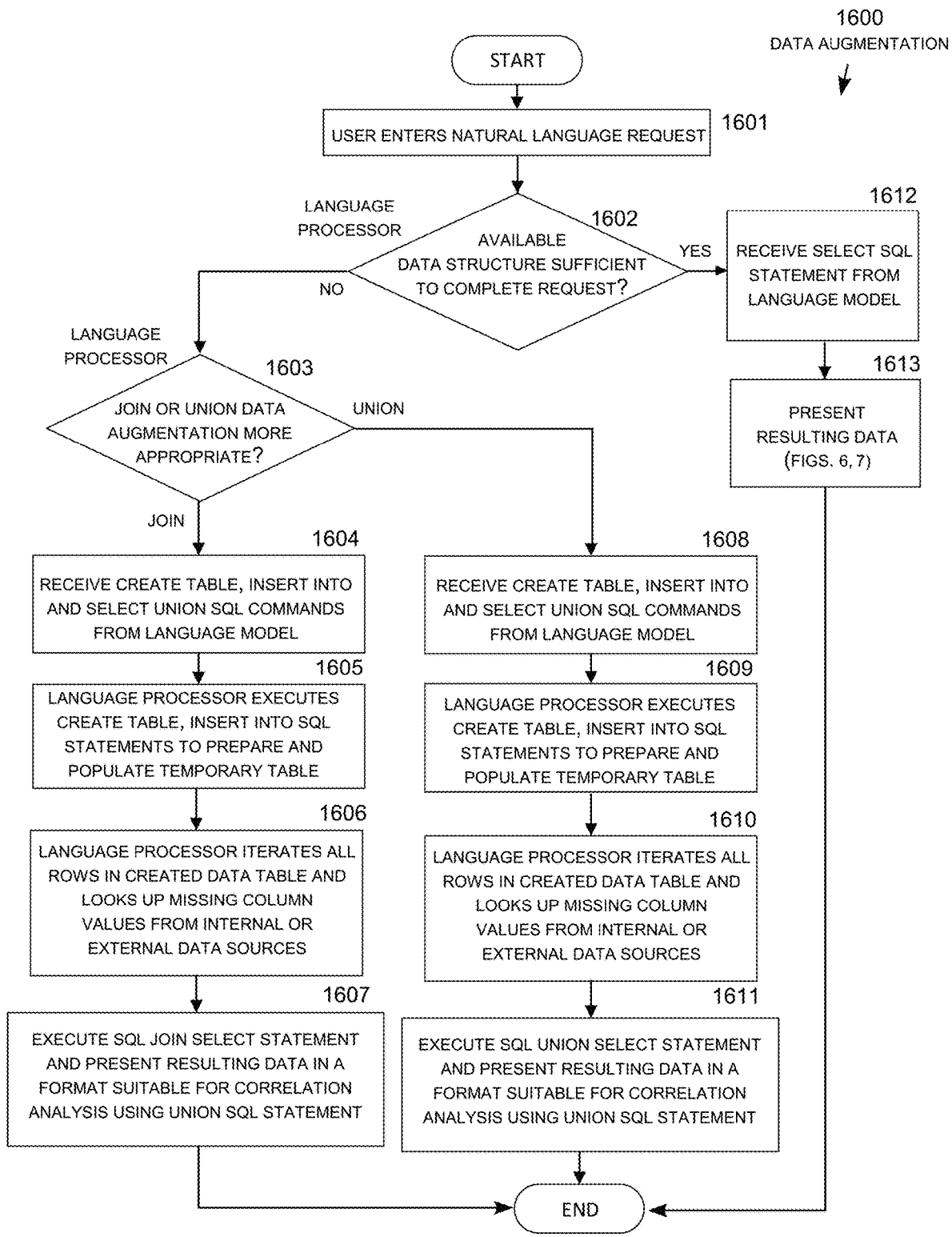
FIG. 16 is a logic flow diagram for data augmentation by the natural language processing system.

FIG. 16 is a logic flow diagram 1600 for data augmentation by the natural language processor 110. In step 1601, the natural language processor 110 receives a natural language request from the user identifying a data request. Step 1601 is followed by step 1602, in which the natural language processor 110 send the request to language data model 116 which is tasked to determine whether an available data structure (e.g., presentation format) is sufficient to completer the data request. If there is no available data structure sufficient to completer the data request, the "no" branch is followed from step 1602 to step 1603, in which the natural language model 116 determines whether it is more appropriate to "join" or "union" data augmentation to satisfy the data request. If the natural language processor 110 determines that it is more appropriate to "join" data augmentation to satisfy the data request, the "join" branch is followed to step 1604, in which the natural language processor 110 receives "create table," "insert into" and "select join" commands from the natural language model 116. Step 1604 is followed by step 1605, in which the natural language processor 110 executes the "create table" and "insert into"

commands to prepare and populate a temporary table. Step 1605 is followed by step 1606, in which the natural language processor 110 iterates all rows in the created data table and looks up missing column values from internal or external data sources, represented by the data sources 114-124 in FIG. 1. Step 1606 is followed by step 1607, in which the natural language processor 110 executed the SQL "join" select statement and presents the resulting date in a format for correlation analysis. Step 1607 is followed by the "end" step.

If there is an available data structure sufficient to completer the data request, the "yes" branch is followed from step 1602 to step 1612, in which the natural language processor 110 received a "select" SQL statement from the natural language model 116. Step 1612 is followed by step 1613, in which the natural language processor 110 present the resulting data analysis to the user, and described further with reference to FIGS. 6 and 7.

Referring again to Step 1603, if the natural language model 116 determines that it is more appropriate to "union" data augmentation to satisfy the data request, the "union" branch is followed to step 1614, in which the natural language processor 110 receives "create table," "insert into" and "select union" commands from the natural language model 116. Step 1614 is followed by step 1615, in which the natural language processor 110 executes the "create table" and "insert into" commands to prepare and populate a temporary table. Step 1615 is followed by step 1616, in which the natural language processor 110 iterates all rows in the created data table and looks up missing column values from internal or external data sources, represented by the data sources 114-124 in FIG. 1. Step 1606 is followed by step 1617, in which the natural language processor 110 executed the SQL "union" select statement and presents the resulting date in a format for correlation analysis. Step 1617 is followed by the "end" step after which the system typically follows to steps described in FIGS. 6 and 9 to display the results to the user and wait for user prompts.

In FIG. 6, one can see a proposed implementation scenario of steps to extract the presentation type from the natural language request using the language model. First, the language model is configured with a command what to respond with using natural language (as this is what the language model is trained to understand). For this example the prompt used was:
"
Reply with response of type a) b) c) where
a) Graph
b) Table
c) Summary
to categorize user request.
"
Next block supplies a few question/answer responses to train the model to understand
how specifically to return proper results. For example:
"
User: Show me chart of all sales amounts in the last 3 months
Reply: a)
User: I want a summary of earnings by date for products listed
Reply: c)
User: show me query of user visits by date
Reply: b)
"
Now the system is configured to receive the requests and produce results. When user makes a request the request can be sent to the language model to receive the response. For example, here are a few request responses that were generated in the Chat GPT implementation of the text-davinci-003 language model:
"
User: List users by location in the last 3 weeks
Reply: b)
User: Show chart of earnings by date
Reply: a)
"
Now the received reply can be used by the business analysis system to present the response to the user. If the reply results in the "c" option (summarization), the presentation proceeds follows: the business analysis system retrieves the data by executing the steps of FIG. 7, and then, instead of displaying the results directly using internal means in FIG. 7 block 704, it asks the language processing system to summarize the results as "summary text" in natural language user-friendly text, and, after receiving the response, presents this result to the user instead of the data obtained directly from the business data storage directly or via and API. This property is saved for now and the workflow automation app moves to the next step of generating the SQL select statement to apply to the data described in FIG. 7.

Those skilled in art would appreciate that this approach can be used for other types of data presentation such as pictures, calendars, different types of diagrams, etc.

When multiple data sets are identified in the natural language query the above prompt may be modified to also detect whether there are multiple metrics and therefore multiple replies be returned for each data set (as in the data augmentation case).

FIG. 7 shows proposed implementation on how to configure and use natural language model 116 for converting the natural language request to the SQL select statement. First the language model session needs to be configured by teaching it the structure of the relational table and direct it to generate SQL statements. The prompt also includes supported values in multiselect fields and description of each field as such clarifications help better understand the human requests. The general structure of the columns and type of data is known to the user at the time of writing the request. I.e. the user knows that he is looking to receive data from Customers and list and that there are columns that contain invoice dates, amount owing and such. User may not know all exact column names in the underlying table but he knows enough to generate high lever requests necessary for his business purpose.

Below is one example how to send prompt to the language model to configure it for Customers list:
"
Microsoft SQL Server SQL tables, with their properties: ##
Receivables(invoicenumber string, invoicedate date, FiscalYear number, FiscalQuarter number, Payee string, Currency string, Amount money, Totalwithtaxes, Country, City, PostalCode,AccountManager, Pool, Netpercentage decimal,PaymentMethod, PaymentDate, Category, Comment, Invoice, receipt, InvoiceTracked, PaymentTracked, CurrentStateName)
CurrentStateName has the following values: Collected, Receivable, Doubtful, Cancelled
FiscalYear is company fiscal year for the invoicedate
FiscalQuarter is one of Q1, Q2, Q3, Q4 and is the fiscal quarter of invoice date
Currency is 3 letter currency code

Country is full Country name
City is the city name within country
PostalCode is Canadian Postal Code or US Zip code
Netpercentage is 100% by default
PaymentMethod is any of Check, Credit Card, Wire
PaymentDate is the date invoice paid #
Which customer owes us the most money? SELECT
"

The prompt is appended by a sample question and SELECT keyword to tell the system to start returning SQL select statements without any descriptions.

The typical response generated is:

"Payee, SUM(Amount) AS TotalOwed FROM Receivables WHERE CurrentStateName='Receivable' OR CurrentStateName='Doubtful' GROUP BY Payee ORDER BY TotalOwed DESC LIMIT 1;"

Once the session is configured the business application (language processor 110) can feed the user supplied input to the language model processor and receive resulting SQL select command. The obtained SQL select query will include the necessary grouping, drilldown and sorting for satisfying the nature of the user's natural language query. Once received the system will apply the command to the respective relational structure and display the results to the user.

Based on experimental findings sometimes the language model may respond with SQL select statement that does not correctly reflect the intention of the user. This may be caused by the wording of user request, spelling errors as well as deficiencies in training set of the language model. To facilitate quick detection and correction of such errors the proposed solution has an additional step of reverse transcribing the SQL select query received into natural human language via natural language model 116 request and presenting it to the user as an alternative description of what was done with the data.

As shown in FIG. 8 we use the already preconfigured language model session to ask for summary of the request. The example command sent can be:

"Briefly summarize in words for a non-technical user what kind of data this query returns for a person of a knowledge of a 5 year old:
SELECT Payee, SUM(Amount) AS TotalOwed FROM Receivables WHERE CurrentStateName='Receivable' OR CurrentStateName='Doubtful' GROUP BY Payee ORDER BY TotalOwed DESC LIMIT 1;"

The command may vary depending on a computer language knowledge and this may be a configurable option that user indicates. For example, for a person skilled in SQL the app user interface may provide configuration option to describe the query with most detailed technical information like this:

"This query selects the Payee column and calculates the total amount owed by each customer by summing the Amount column for all rows where the CurrentStateName is either 'Receivable' or 'Doubtful'. The results are then grouped by Payee and ordered by TotalOwed in descending order. The LIMIT 1 at the end of the query limits the results to only the customer who owes the most money.

and for a clerk, who is not familiar with relational database querying techniques, the query can be similar to above with result simplified to this:"

This query tries to find out which customer takes the longest time to pay their bills on average. It calculates how many days it takes each customer to pay their bill, and then sorts them by the longest time to pay. It only looks at bills that have been paid in full.
"

The next step is to retrieve the response from the language model and display it to the user for further approval as described in FIG. 9.

The Preferred embodiment of the approval step described in FIG. 9 starts by displaying the summary returned from the language model to the user adjacent to the results in this case the results are shown as a summary textual presentation. The area has two options- to Approve or Reject. The user can Reject the results if the summary does not describe the desired query that was requested. If the rejection is made the system may try to add a prompt to the language model to regenerate the query as the summary was not accepted, and if this does not work the second time and user rejects the results again it will prompt the user to simplify the request. FIG. 13 demonstrates how the same screen looks when the user requested to show results as a table. Similarly if the user requested to see the graph, the graph would occupy the place where the table is in FIG. 13. If the result returns multiple records then each record will have its own row in the table section area An example embodiment of the user interface of such functionality is shown in FIG. 10, where the screen contains a result in Summary format as determined in algorithm described in FIG. 6 and the summary is displayed below with accept and reject buttons. An example of an embodiment of the block 610 of FIG. 6 for obtaining the human friendly textual result in Summary format following execution of the example generated by the language system as described in the description of FIG. 7 above, the following natural language query can be used:

Summarize response to the following query "Which customer owes us the most money?" using the following data "Payee: ABC Co, LLC; TotalOwed: 167223.35"

The language system responds with the following text that is then presented to the user as per FIG. 10:

The customer that owes the most money is ABC Co, LLC, with a total amount owed of $167,223.35

It is understood that the exact interface in the system may vary and may include pictorial icons, different layout of the data as well as styles and fronts. The functionality may be split into multiple dialogs in a different manner as well.

To improve generation of the results for complex queries where no amount of rewording helps achieve the desired results the invention describes a step-by-step results filtering model which in addition to utilizing the above described algorithms uses the context awareness of the language system and memory of interaction in the given session. This method allows for the user to sequentially apply filters and commands not to the original data set of the business application but to the result set generated as part of the previous step. In such model the user will be working with a notion of history of numbered or named requests asking the system to perform command narrowing the most recent or another data set by applying filter to it or asking the system to combine one set into another when determining which records to display.

For example, when processing complex language query that does not get converted directly into subselect properly:

"
Which is our oldest customer that has still been active in 2022?
"

The alternative history of commands to achieve desired results could be:

"a list of ail customers with invoices in 2022. Assign ID 1 to this request. SELECT"

"a list of all payee names and invoice dates for all time for customers from the ID 1.
ASSIGN LD 2 TO 'FF EIS REQUEST SETITI'"
"a list of one earliest invoice date for each payees from the previous query. Assign ID 3 to this request. SELECT"
"a list of payees from ID 3 ordered by the earliest invoice date in ascending order. Assign ID 4 to this request. SELECT"
"list only the first record from the previous query. Assign ID 5 to this request. SELECT"

The user then will be able to either reference the ID of the query right in the text for the new request or to select a results from history against which to run the new query from a prompt dialog with history IDs.

The approach of using the history can be combined with approval rejection approach and the reuse of the session as long as the relational model does not change.

In one implementation it is also possible to clear the history of natural language model 116 session completely or one by one for the saved IDs by sending a command similar to "discard memory of ID 3 and do not use it in further processing" to the language model.

The same transcribing capability from natural language to SQL as described in the above implementation for data analysis can be used to perform data modification by prompting to generate INSERT, DELETE or UPDATE statement in addition to SELECT.

FIG. 1 demonstrates the PREFERRED SYSTEM ARCHITECTURE FOR NATURAL LANGUAGE PROCESSOR CONFIGURATION. Language processor interfaces with the mobile and office users via the user interface and with the backend business app logic and business data storage stored in the backend database. Additionally, natural language processor relies on a connection to a trained language model which can either be built in or accessible externally as a service over internet or other connectivity.

FIG. 12 describes how we can control IoT devices that are not represented in relational model in the app using natural language model 116 assist. In such case the natural language processor 110 will first internally represents actuators as a virtual SQL table and language model to form SQL commands to update in that table therefore controlling the state and reading current states of the actuators. In addition to simple SELECT command this model uses SET, UPDATE and DELETE commands as described in the session example below.

Preferred embodiment of actuators control via language model: The prompt for language model in such case may look similar to this:
Microsoft SQL Server SQL tables, with their properties:

Actuators(name string, location string, state boolean)
State can be on (1) or off (0)
Name is the human readable name like "refrigerator relay"
Location is the address where the actuator resides, has format devicename.portname

Turn on "main room refrigerator". UPDATE
Result:
Actuators SET state=1 WHERE name='refrigerator' AND location='main room.refrigerator';
Command: "Please turn on heaters in the device "basement" Result: "UPDATE Actuators SET state=1 WHERE location LIKE 'basement.heater %';"

Therefore. With this methodology, the language model ad-hoc function can be used to on demand control and management of connected devices without a need for programming.

FIG. 14 describes an embodiment of ad-hoc data modification which can be done using the language model ability to translate user commands to the update or delete statements of the SQL language, specifically instruct the business flow system to execute updates to multiple records satisfying the desired criteria using the internal business system APIs for data querying and modification in leu of direct database update.

Similarly to the ad-hoc query capability described in FIGS. 6-11 the user interface will allow the user to enter command in natural language that is then fed to the configured language model to transcribe the commands to SQL commands. For the purposes of this demonstration the use case is to allow the user to quickly send the subset of stores in an audit application for reinspection where the inspection was performed more than 1 year ago.

Since in business workflow systems the records are typically modified through menu items and direct database update would not be allowed the data definition table sent to the language model during configuration will include an extra synthetic column called "operation name". In the description of the table for the language model the additional text will be added which lists the column as accepting the value with the operation name and also describes in detail each operation as specified in design time. Then the instructions to the language model system would include to set the value to the one listed when the semantics of the natural request matches the operation description.

Upon receiving the generated command from the language model the business flow will first extract the name of the operation from this extra column and then execute the request to select all records as per where clause and then execute the operation specified, using business system specific APIs, supplying the values specified in update list to the ones specified by the language model query.

In another variation of this embodiment the business flow system may execute the where clause first and show to the user the list of records that will be modified and upon confirmation will execute the mass update command and display results as per FIG. 15.

For example below is one possible embodiment session for configuring and using Chat GPT to perform the above actions. For this example the form for "Store audits" is assumed to contain the following fields: "Store Name", "Store address", "Date of last audit", "Audit scheduled", "Auditor". And the description of each field is assumed to be provided by the form designer in its metadata. The following operations are defined by the form designer: "Review details", "Schedule audit", "Update details" and their respective descriptions are also provided by the form designer in design time in its metadata.

The configuration prompt that needs to be sent to the language model to start performing the above described embodiment then needs to look similar to this with important points of making sure all values in the fields and their purposes described in the section below the table and also a separate OperationName column added with the values of the operation names and their descriptions. Also, it is important to include this statement "In all UPDATE statements also set the OperationName field from the user input." As otherwise the OperationName field would not be assigned by the language model output.

Configuration prompt (done once per session):
\#\#\#Microsoft SQL Server SQL tables, with their properties:
\#
\#StoreAudits(StoreName string, StoreAdress string, date LastAuditDate, AuditScheduled Boolean, OperationName string)
\#AuditScheduled can be "1" (audit is scheduled) or "0" (audit is not scheduled) tells whether an audit is currently scheduled for this store and needs to be performed.
\#StoreName is the human readable name of the store like "Flower shop"
\#StoreAddress is the address of the store
\#LastAuditDate is the date of last audit, or empty (null) if the audit has not been completed yet
\#Auditor is the name of the person who will perform or who performed the last audit. Can be empty if no audit has ever been performed
\#OperationName contains the operation name that should be performed on the record to complete the requested action by user. Can be any of: "Review details" (to view the details of the record as read-only), "Schedule audit" (to update all fields required to perform a new audit for the store and automatically update the AuditScheduled value to 1), "Update details" (to update only the store information and address). Fill this field with one of the three values determined based on the user request received.
\#In all UPDATE statements also set the OperationName field from the user input.
\#
\#\#\#List all stores where audit has been performed. Only list SQL query no explanation text. SELECT
Chat GPT:
SELECT*FROM StoreAudits WHERE LastAuditDate IS NOT NULL
Request:
Reschedule audit for all stores that have not been inspected in the last year.
Chat GPT:
UPDATE StoreAudits SET AuditScheduled=1, OperationName="Schedule audit" WHERE LastAuditDate<DATE_SUB(CURDATE( ) INTERVAL 1 YEAR)
Request:
Reschedule audit for all stores that have not been inspected in the last year and assign to Mika Callighan to perform.
Chat GPT:
UPDATE StoreAudits SET AuditScheduled=1, Auditor="Mika Callighan", OperationName="Schedule audit" WHERE LastAuditDate<DATE_SUB(CURDATE( ) INTERVAL 1 YEAR)

After each response above marked "Chat GPT" it is possible to ask the model to Summarize the SQL statement for verification similarly to the command below and use the summary for presentation to the user for command verification and acceptance before execution is commenced (similarly to how described in ad-hoc query scenario in FIG. 6).
Request:
Summarize in 1 sentence what this command does for a 5 year old: "UPDATE StoreAudits SET AuditScheduled=1, Auditor="Mika Callighan", OperationName="Schedule audit" WHERE LastAuditDate<DATE_SUB(CURDATE( ) INTERVAL 1 YEAR)"
Chat GPT:
This command updates the information for stores that haven't been checked in a long time, saying that an audit needs to happen soon and that Mika Callighan will do it.

An example user interface for performing interaction and approval of requests in shown in FIG. 15. In this example the user has a chance to approve the command before executing it and when executed the command shows the number of records updated, but it is understood that a different layout of the user interface, or more detailed response may be used with this algorithm methodology.

Data augmentation: An additional feature of the present invention is ability to augment business application data with externally available public data based on the analysis of the natural language user request.

In this embodiment language processor uses natural language analysis from the language model to determine whether user's request can be satisfied using data available in the business application and its database or whether augmentation with additional external data is necessary in order to satisfy the user request. Those skilled in art can appreciate that this approach can be equally applied to both query business system and updating data in the business system. To illustrate preferred embodiment for the query scenario, refer to FIG. 16. According to FIG. 16 upon receiving request from the user the language processor makes a request to the language model to determine whether available data structure from the business application is sufficient to satisfy user request. In case it is sufficient, the language processor follows the steps described previously for processing such request including FIGS. 6-9. In case the data is not sufficient the language processor determines whether union or join type of data augmentation is appropriate for completing user's request. The script below demonstrates an example for join data augmentation processing. After determining the preferred type of data augmentation language processor uses language model to obtain create table statement for holding augmentation data, insert into statement that populates that data with relational key values and either a join SQL statement or a union SQL statement that can be used to augment data from the business application data with additional required data that shall be held in the temporary table created with the obtained create table SQL statement. Following that the language processor executes the obtained create table and insert into SQL statements to prepare set of records for data augmentation in a temporary table. Following that the language processor iterates all rows in the created temporary table and uses internal or external data sources to lookup the values for the non-key columns and saves the obtained values in the corresponding records of the temporary table. This lookup can be performed using various cloud or local programming APIs and information retrieval method with or without further assistance of the language model to formulate the queries necessary for retrieval of each particular data value. Once the augmentation data is ready, language processor proceeds to execute the rest of the logic required to retrieve augmented data using the previously obtained SQL select query and present it to the user. In case of select join augmentation the language processor follows the previously described logic from FIGS. 6-7. In case of select union augmentation the data obtained from executing the select union query contains more than one data set. The language processor proceeds to present these data sets to the user in a format suitable for analyzing correlation between these data sets. For preferred embodiment of how this can be achieved using graphical chart with automatic aligning and scaling of multiple data sets refer to U.S. Pat. No. 10,600,216B2.

EXAMPLE EMBODIMENT

Figure 17:
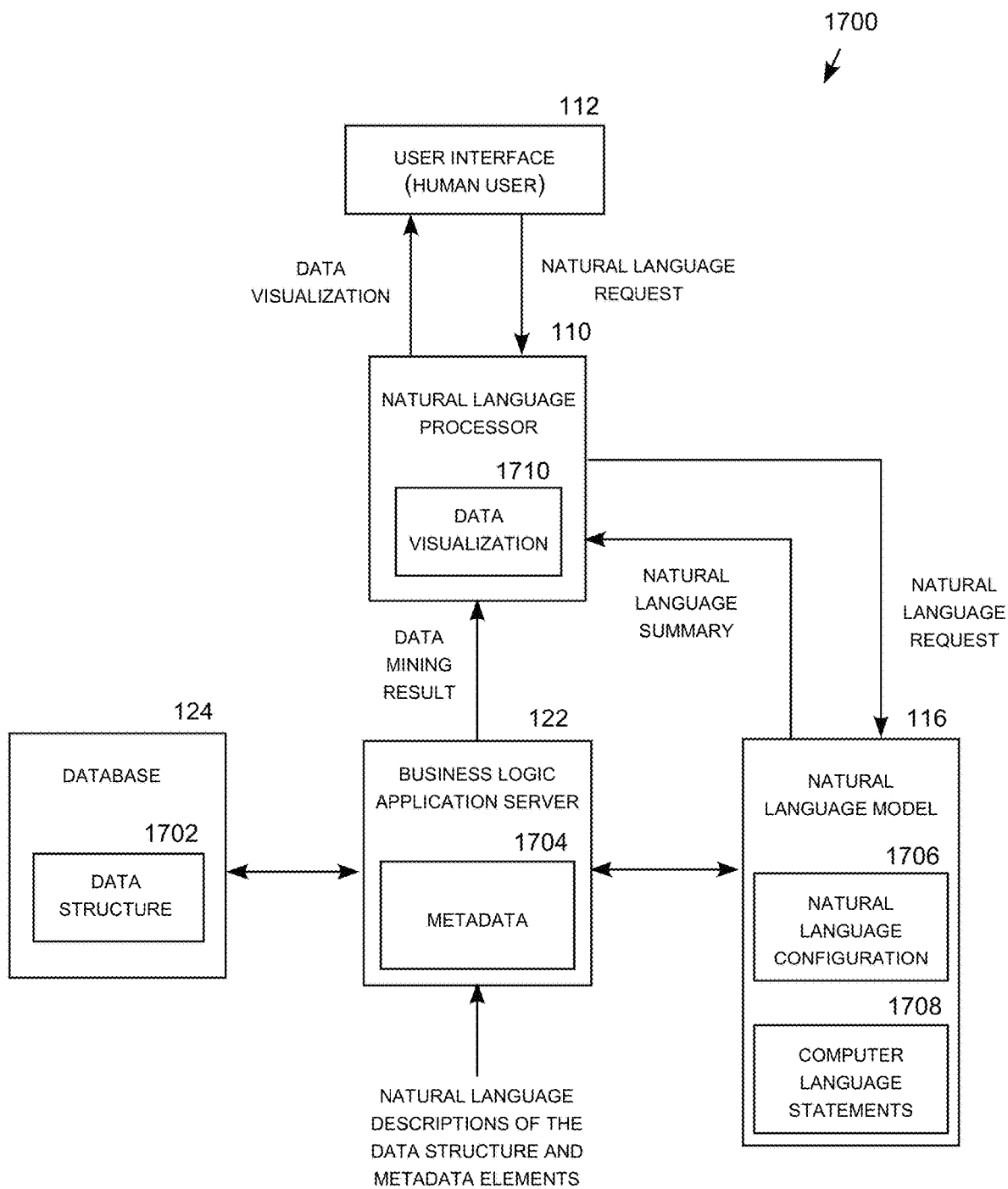
FIG. 17 is a functional block diagram illustrating the natural language processing system generating computer executable statements from natural language requests.

Microsoft SQL Server SQL tables, with their properties:

EnergeConsumption(Location string, Date date, EnergyConsumed decimal)
Location is the GPS coordinate of the location where the consumption has been measures.
Date is the date when the consumption has been measures
EnergyConsumed is the amount of kWh of energy consumed

Analyze the request from the user every time and if the information to complete the request is missing reply with SQL CREATE TABLE STATEMENT to create the missing structure followed by resulting SQL SELECT statement to complete the request. If all information is available reply with SQL select statement to complete the request, no explanation on SQL details.
Request: Show me energy consumed by location for Mar. 24, 2021.
RESPONSE: SELECT Location, EnergyConsumed
FROM EnergeConsumption
WHERE Date='2021-03-24'
Microsoft SQL Server SQL tables, with their properties:

QuarterlyRevenue(FiscalYear number, FiscalQuater number, Revenue money)

REQUEST: in which quarter did we have the highest revenue?
RESPONSE: SELECT FiscalYear, FiscalQuater, Revenue
FROM QuarterlyRevenue
ORDER BY Revenue DESC
LIMIT 1;
Microsoft SQL Server SQL tables, with their properties:

RevenueForRegion(Region string, Revenue money, CurrencyCode string)

REQUEST: which region has the highest revenue in US dollars?
Response:
-- create table
Create table CurrencyExchange(CurrencyCode string, USDExchangeRate money)
-- select into
INSERT INTO CurrencyExchange (currencycode)
SELECT DISTINCT currencycode
FROM RevenueForRegion;
-- select from table using join
Select max(revenue*USDExchangeRate)
From RevenueForRegion revenue, CurrencyExchange exchange
Where revenue.CurrencyCode=exchange.currencycode
Microsoft SQL Server SQL tables, with their properties:

EnergeConsumption(Location string, Date date, EnergyConsumed decimal)
Location is the GPS coordinate of the location where the consumption has been measures.
Date is the date when the consumption has been measures
EnergyConsumed is the amount of kWh of energy consumed

REQUEST: Show comparison of energy consumption and ambient temperature by location
Response:
CREATE TABLE AmbientTemperature (
Location string,
Date date,
Temperature decimal
);
INSERT INTO AmbientTemperature (Location, Date)
SELECT DISTINCT Location, Date
FROM EnergeConsumption;
SELECT EC.Location, EC.EnergyConsumed, AT.Temperature
FROM EnergeConsumption EC
JOIN AmbientTemperature AT ON EC.Location=AT.Location AND EC.Date=AT.Date;

FIG. 17 is a functional block diagram 1700 illustrating the natural language processing system generating computer executable statements from natural language requests. As previously described, the natural language processor 110 engages in iterative natural communications with a human user through the user interface 112 to identify, develop, refine, update, and augment data analysis requests, which are presented to the human user through a variety of data visualizations. An important aspect of this functionality is the ability of the natural language model 116 to create computer executable statements from natural language commands and of the natural language processor 110 to execute those statements to conduct data mining analyses. FIG. 17 illustrates an example of how to configure and use the features of the system in this process.

In this example, the source data is located in a data structure 1702 in the database 124, which is accessed by the business logic application server 122. In a typical business application environment, the data structure itself only contains minimal natural language descriptions, such as column names, field names and the like limited to a few characters. The ability to intelligently access and present the data items in the data structure 1702 through natural language requests requires a much greater level of natural language description. This additional level of natural language description is entered into the system through metadata 1704 stored in the business logic application server 122.

The metadata 1704 is an expansive form of software commenting written in natural language, in which individual comments are linked to defined elements of the data structure. The ability to link individual comments to individual data items and groups of data items is virtually unlimited, allowing the configuring technician to create and link natural language descriptions at their discretion. A higher level of natural language commenting in the metadata 1704 facilitates a higher level of natural language interpretation and user interaction by the natural language processing system 100. To provide a few illustrative examples, natural language descriptions encoded into the metadata 1704 may describe the list of supported values for numeric fields and their intended usage, the purpose of the fields in each table and the values stored in them, the purpose of the tables, rules about certain combinations of values used, et cetera.

Once a rich set of natural language descriptions have been encoded into the metadata 1704, those natural language descriptions are configured into the natural language model 116 to create the natural language configuration 1706. The natural language model 116 is also pre-trained to to generate computer language statements 1708 that are executable on the database 124 to conduct data mining on the data structure 1702. Like the natural language configuration 1706, the commands to generate computer language statements 1708 are applicable to specific fields and groups of fields in the data structure 1702 allowing the computer language statements to be correlated with the natural language configuration 1706. This allows the language model 116 to translate natural language requests received from the natural language processor 110 into the computer executable statements that can be executed on the database 124 to conduct data mining on the data structure 1702 in response to natural language commands. This also allows the language model 116 to summarize the data mining results in natural language, which is returned to the natural language processor 110. This is an ongoing process, as all of these elements are continually updated and upgraded during ongoing utilization of the system. The preceding description of FIGS. 7-16 provide a few specific examples this process using SQL as the representative computer language.

Once the natural language descriptions and table structure metadata are configured, the natural language processor 110 receives a natural language request form a human user through the user interface 112. This can be accomplished through an iterative refinement process as described with reference to FIG. 4. The natural language processor 110 sends the natural language request to the natural language model 116, which converts the natural language request into a computer executable statement for conducting a data mining operation. The natural language model 116 computer executable statement is ultimately sent to the business logic application server 122, which runs the computer executable statement on the data base 124 to extract responsive data from the data structure 1702. The database 124 returns the data mining result to the business logic application server 122, which sends the data mining result to the language model 116 via language processor 110, and the language model 116 generates a natural language summary of the data mining result. The natural language model 116 sends the natural language summary to the natural language processor 110 as a response to the initiating natural language request. In addition, either the business application server 122 or the natural language model 116 returns data mining result to the natural language processor 110, which creates a data visualization 1710 positioning the datamining result adjacent to the natural language summary. FIG. 10 shows a representative example of this type of data presentation, which shows a single data item as the data mining result. Once the natural language processing foundation shown in FIG. 17 is in place, more sophisticated data mining and visualization can be performed to create, for example, the data visualizations described with reference to FIGS. 1-6 utilizing computer executable statement responsive to natural language requests as described with reference to FIGS. 7-17

It will be understood that specific embodiments may include a variety of features and options in different combinations, as may be desired by different users. Practicing the invention does not require utilization of all, or any particular combination, of these specific features or options. The specific techniques and structures for implementing particular embodiments of the invention and accomplishing the associated advantages will become apparent from the following detailed description of the embodiments and the appended drawings and claims.

Although particular embodiments of this disclosure have been illustrated, it is apparent that various modifications and embodiments of the disclosure may be made by those skilled in the art without departing from the scope and spirit of the disclosure. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A natural language processing system for performing a method comprising:
    configuring a business logic application server with metadata comprising natural language descriptions of a data structure;
    configuring a natural language model with the metadata and natural language description of metadata elements from the business logic application;
    receiving a natural language request from a human user;
    the natural language model converting the natural language request to a specific computer language statement based on the metadata;
    executing the specific computer language statement on the data structure to obtain a result comprising data responsive to the natural language request;
    displaying to the human user a data visualization of the result;
    wherein the computer language statement comprises a data modification request, further comprising performing a data modification on the data structure in response to the data modification request, and displaying to the human user a status of the data modification.

2. The natural language processing system for performing the method of claim 1, wherein:
    the metadata further comprises a list of operation names associated with a programming interface of the business logic application server and instructions for inferring a selected operation from the list of operation names based on the data modification request;
    the data modification request converted by the natural language model further comprises the selected operation and name value pairs of columns and values to be updated; and
    executing the computer statement comprises:
        extracting a filter clause from the data modification request,
        creating a subset of records of the data structure using the programming interface of the business logic application server; and
        for each record of the subset of records, using the name vale pairs of columns and values to be updated to invoke the selected operation using the programming interface of the business logic application server with the name and values from the data modification request converted by the natural language model.

3. A natural language processing system for performing a method comprising:
- configuring a business logic application server with metadata comprising natural language descriptions of a data structure;
- configuring a natural language model with the metadata and natural language description of metadata elements from the business logic application;
- receiving a natural language request from a human user;
- the natural language model converting the natural language request to a specific computer language statement based on the metadata;
- executing the specific computer language statement on the data structure to obtain a result comprising data responsive to the natural language request;
- displaying to the human user a data visualization of the result;
- wherein displaying to the human user further comprises, the natural language model inferring a preferred presentation format from the natural language request, and displaying to the human user the data visualization in the preferred format inferred by the natural language model.

4. A natural language processing system for performing a method comprising:
- configuring a business logic application server with metadata comprising natural language descriptions of a data structure;
- configuring a natural language model with the metadata and natural language description of metadata elements from the business logic application;
- receiving a natural language request from a human user;
- the natural language model converting the natural language request to a specific computer language statement based on the metadata;
- executing the specific computer language statement on the data structure to obtain a result comprising data responsive to the natural language request;
- displaying to the human user a data visualization of the result;
- wherein the computer language statement comprises an SQL statement, the metadata is SQL table and column metadata, and natural language descriptions of data structures are a combination of SQL table and column names and additional descriptions that may be available in the business application system.

5. A natural language processing system for performing a method comprising:
- configuring a business logic application server with metadata comprising natural language descriptions of a data structure;
- configuring a natural language model with the metadata and natural language description of metadata elements from the business logic application;
- receiving a natural language request from a human user;
- the natural language model converting the natural language request to a specific computer language statement based on the metadata;
- executing the specific computer language statement on the data structure to obtain a result comprising data responsive to the natural language request;
- displaying to the human user a data visualization of the result;
- wherein the data structure further comprises a virtual data storage structure that virtually joins data metrics of entities connected to the business analysis system to execute the structured language commands obtained from the natural processing system.

6. The natural language processing system of claim 5, wherein the entities connected to the business analysis system are IoT devices.

7. A natural language processing system for performing a method comprising:
- configuring a business logic application server with metadata comprising natural language descriptions of a data structure;
- configuring a natural language model with the metadata and natural language description of metadata elements from the business logic application;
- receiving a natural language request from a human user;
- the natural language model converting the natural language request to a specific computer language statement based on the metadata;
- executing the specific computer language statement on the data structure to obtain a result comprising data responsive to the natural language request;

displaying to the human user a data visualization of the result;
preparing alternative data visualizations of the data responsive to the natural language request;
- presenting the alternative data visualizations of the result to the human user;
- exchanging natural language communications with the human user to obtain feedback regarding a selected data visualization from the alternative data visualizations;
- modifying the selected data visualization based on the feedback;
- presenting the modified data visualization to the user.

8. A natural language processing system for performing a method comprising:
- configuring a business logic application server with metadata comprising natural language descriptions of a data structure;
- configuring a natural language model with the metadata and natural language description of metadata elements from the business logic application;
- receiving a natural language request from a human user;
- the natural language model converting the natural language request to a specific computer language statement based on the metadata;
- executing the specific computer language statement on the data structure to obtain a result comprising data responsive to the natural language request;
- displaying to the human user a data visualization of the result;
- wherein the computer language statement comprises a data mining request, further comprising submitting the data mining request to the business logic application server, and the business logic application server executing the data mining request on the data structure to obtain a data mining result, the data visualization comprising the data mining result;
- exchanging natural language communications with the human user to identifying missing data responsive to the data analysis request;
- conducting additional data mining to obtain the missing data;
- modifying the selected data visualization to include the missing data;
- presenting the modified data visualization including the missing data to the user.

9. A natural language processing system for performing a method comprising:
- configuring a business logic application server with metadata comprising natural language descriptions of a data structure;
- configuring a natural language model with the metadata and natural language description of metadata elements from the business logic application;
- receiving a natural language request from a human user;
- the natural language model converting the natural language request to a specific computer language statement based on the metadata;
- executing the specific computer language statement on the data structure to obtain a result comprising data responsive to the natural language request;
- displaying to the human user a data visualization of the result;
- wherein the computer language statement comprises a data mining request, further comprising submitting the data mining request to the business logic application server, and the business logic application server executing the data mining request on the data structure to obtain a data mining result, the data visualization comprising the data mining result;
- exchanging natural language communications with the human user to identify updated data responsive to the data analysis request;
- conducting additional data mining to obtain the updated data;
- modifying the selected data visualization to include the updated data;
- presenting the modified data visualization including the updated data to the user.

10. A natural language processing system for performing a method comprising:
- configuring a business logic application server with metadata comprising natural language descriptions of a data structure;
- configuring a natural language model with the metadata and natural language description of metadata elements from the business logic application;
- receiving a natural language request from a human user;
- the natural language model converting the natural language request to a specific computer language statement based on the metadata;
- executing the specific computer language statement on the data structure to obtain a result comprising data responsive to the natural language request;
- displaying to the human user a data visualization of the result;
- wherein the computer language statement comprises a data mining request, further comprising submitting the data mining request to the business logic application server, and the business logic application server executing the data mining request on the data structure to obtain a data mining result, the data visualization comprising the data mining result;
- conducting iterative prompt-and-response natural language conversations with a human user to identify a multi-parameter data analysis request;
- conducting data mining operations associated with the multi-parameter data analysis command to obtain a data mining result comprising multiple parameters responsive to the multi-parameter data analysis request;
- determining a common range dimension for the multiple parameters;
- aligning the multiple parameters on the common range dimension;
- formatting a visualization of the multiple parameters;
- presenting the visualization of the multiple parameters to the user.

11. A natural language processing system for performing a method comprising:
- configuring a business logic application server with metadata comprising natural language descriptions of a data structure;
- configuring a natural language model with the metadata and natural language description of metadata elements from the business logic application;
- receiving a natural language request from a human user;
- the natural language model converting the natural language request to a specific computer language statement based on the metadata;
- executing the specific computer language statement on the data structure to obtain a result comprising data responsive to the natural language request;
- displaying to the human user a data visualization of the result;
- exchanging natural language communications with the human user to create a further defined multi-parameter data analysis request;
- presenting a further modified data visualization to the user based on the further defined multi-parameter data analysis request.

12. A natural language processing system performing a method comprising:
- conducting iterative prompt-and-response natural language conversations with a human user to identify an actionable data analysis command;
- conducting data mining operations associated with the actionable data analysis command to obtain a data mining result;
- determining that the data mining result is missing relevant data;
- identifying potential locations of the missing relevant data;
- prompting the user to request data augmentation to supply the missing relevant data from one or more of the potential locations;
- receiving from the human user an indication of an approved data augmentation task;
- conducting the approved data augmentation task to obtain the missing relevant data;
- presenting a visualization to the user of the data mining result augmented with the missing relevant data.

13. The natural language processing system of claim 12 further comprising:
- configuring a business logic application server with metadata comprising natural language descriptions of a data structure;
- configuring a natural language model with the metadata and natural language description of metadata elements from the business logic application;
- the natural language model converting the natural language request to a specific computer language statement based on the metadata;
- conducting the data mining operations to obtain the data mining result by executing the specific computer language statement on the data structure.

14. The natural language processing system for performing the method of claim 13, wherein presenting the visualization further comprises:
  using the natural language model to generate a natural language summary of the data mining result based on the metadata and the natural language request from the human user;
  displaying to the human user a data visualization of the natural language summary representation of the data mining result.

15. A natural language processing system comprising a processor performing a method comprising:
  conducting iterative prompt-and-response natural language conversations with a human user to identify a multi-parameter data analysis request;
  conducting data mining operations associated with the multi-parameter data analysis command to obtain a data mining result comprising multiple parameters responsive to the multi-parameter data analysis request;
  determining a common range dimension for the multiple parameters;
  aligning the multiple parameters on the common range dimension;
  formatting a visualization of the multiple parameters;
  presenting the visualization of the multiple parameters to the user.

16. The natural language processing system of claim 15, further comprising:
  configuring a business logic application server with metadata comprising natural language descriptions of a data structure;
  configuring a natural language model with the metadata and natural language description of metadata elements from the business logic application;
  the natural language model converting the natural language request to a specific computer language statement based on the metadata;
  conducting the data mining operations to obtain the data mining result by executing the specific computer language statement on the data structure.

17. The natural language processing system for performing the method of claim 16, wherein presenting the visualizations further comprises:
  using the natural language model to generate a natural language summary of the data mining result based on the metadata and the natural language request from the human user;
  displaying to the human user a data visualization of the natural language summary representation of the data mining result.

\* \* \* \* \*